United States Patent
Halavy

(10) Patent No.: US 10,075,677 B2
(45) Date of Patent: Sep. 11, 2018

(54) METHOD AND SYSTEM FOR CONDUCTING VIDEO CONFERENCES OF DIVERSE PARTICIPATING DEVICES

(71) Applicant: Polycom, Inc., San Jose, CA (US)

(72) Inventor: Avishay Halavy, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/174,459

(22) Filed: Jun. 6, 2016

(65) Prior Publication Data

US 2016/0286168 A1    Sep. 29, 2016

Related U.S. Application Data

(62) Division of application No. 13/869,781, filed on Apr. 24, 2013.

(60) Provisional application No. 61/677,200, filed on Jul. 30, 2012.

(51) Int. Cl.
| | |
|---|---|
| *H04N 7/15* | (2006.01) |
| *H04N 19/172* | (2014.01) |
| *H04N 19/44* | (2014.01) |
| *H04N 19/91* | (2014.01) |
| *H04L 12/741* | (2013.01) |
| *H04L 29/06* | (2006.01) |
| *H04N 7/14* | (2006.01) |

(52) U.S. Cl.
CPC ............. *H04N 7/152* (2013.01); *H04L 45/74* (2013.01); *H04L 65/403* (2013.01); *H04L 65/60* (2013.01); *H04N 7/147* (2013.01); *H04N 19/172* (2014.11); *H04N 19/44* (2014.11); *H04N 19/91* (2014.11)

(58) Field of Classification Search
USPC .................................................. 379/202.02
See application file for complete search history.

(56) References Cited

U.S. PATENT DOCUMENTS

| | | | |
|---|---|---|---|
| 5,570,363 A | 10/1996 | Holm | |
| 5,600,646 A | 2/1997 | Polomski | |
| 5,821,986 A | 10/1998 | Yuan et al. | |
| 5,838,664 A | 11/1998 | Polomski | |
| 5,929,898 A | 7/1999 | Tanoi | |
| 5,983,192 A | 11/1999 | Botzko et al. | |
| 6,141,597 A | 10/2000 | Botzko et al. | |
| 6,182,031 B1 | 1/2001 | Kidder et al. | |
| 6,300,973 B1 | 10/2001 | Feder et al. | |
| 6,453,336 B1 | 9/2002 | Beyeda et al. | |

(Continued)

FOREIGN PATENT DOCUMENTS

| | | |
|---|---|---|
| CA | 2319655 | 6/2001 |
| WO | 2005048600 | 5/2005 |

OTHER PUBLICATIONS

Karczewicz, M. and Kurceren, R. "The SP- and SI-Frames Design for H.264/AVC"; IEEE Transactions on Circuits and Systems for Video Technology, vol. 13, No. 7, Jul. 2003, 8 pages.

(Continued)

*Primary Examiner* — Amal Zenati
(74) *Attorney, Agent, or Firm* — Blank Rome, LLP

(57) ABSTRACT

A novel universal bridge (UB) can handle and conduct multimedia multipoint conferences between a plurality of MREs and LEPs without using an MRM, an MCU and a gateway. Further, a UB can be configured to allocate and release resources dynamically according to the current needs of each conferee and the session.

13 Claims, 6 Drawing Sheets

(56) References Cited

U.S. PATENT DOCUMENTS

| | | | |
|---|---|---|---|
| 6,496,216 | B2 | 12/2002 | Feder et al. |
| 6,580,754 | B1 | 6/2003 | Wan et al. |
| 6,683,909 | B1 | 1/2004 | Falco |
| 7,006,456 | B2 | 2/2006 | Rabipour et al. |
| 7,085,243 | B2 | 8/2006 | Decker et al. |
| 7,133,362 | B2 | 11/2006 | Chu et al. |
| 7,136,394 | B2 | 11/2006 | Horowitz et al. |
| 7,245,710 | B1 | 7/2007 | Hughes |
| 7,310,320 | B2 | 12/2007 | Decker et al. |
| 7,593,032 | B2 | 9/2009 | Civanlar et al. |
| 7,830,824 | B2 | 11/2010 | Decker et al. |
| 8,228,363 | B2 * | 7/2012 | Halavy .................. H04N 7/152 348/14.08 |
| 2004/0257433 | A1 * | 12/2004 | Lia ........................ H04N 7/147 348/14.09 |
| 2011/0261815 | A1 * | 10/2011 | Armstrong .......... H04L 12/4625 370/390 |
| 2012/0004918 | A1 | 1/2012 | Feng et al. |

OTHER PUBLICATIONS

Walter, M., "Advanced Bitstream Switching for Wireless Video Streaming"; Institute for Communications Engineering, Munich University of Technology, Prof. Dr.-Ing. J. Hagenauer, Diploma Thesis, Nov. 26, 2005, 103 pages.

Jinzenji, Hiroshi, et al. "A Scalable Video Distribution Technique for the Internet"; IEEE Globecom Internet 1996 Conference, London, Nov. 1996, 9 pages.

Radha, Hayder, et al. "Scalable Video Transcaling for the Wireless Internet"; EURASIP Jorunal on Applied Signal Processing (2004): 2, pp. 265-279.

Feng, Wei, et al. "Layered Self-Identifiable and Scalable Video Codec for Deliver to Hetergeneous Receivers"; Department of Electrical and Computer Engineering, National University of Singapore; http://www.ece.nus.edu.sg/stfpage/eletrck/papers/vcip2003.pdf.

Keller, Ralph, et al. "An Active Router Architecture for Multicast Video Distribution"; Computer Engineering and Networks Laboratory, ETH Zurich, Switzerland; Applied Research Laboratory, Washington University, St. Louis MO, USA; This paper appears in INFOCOM 2000. Nineteenth Annual Joint Conference of the IEEE Computer and Communications Societies. Proceedings. IEEE, (2000):3; pp. 1137-1146.

Horne, Uwe, et al. "Scalable Video Transmission for the Internet"; ProceedingsJENC8; pp. 921-1-92-8.

Hu, Qingwen, et al. "Image/Video Spatial Scalability in Compressed Domain" IEEE Transactions on Industrial Electronics, vol. 45, No. 1, (1998); pp. 23-31.

Markopoulou, Athina, et al. "EE368C: Project Proposal Transmission of Layered Video Using Priority Dropping"; Group #6, Stanford University; http:/www.stanford.edu/class/ee368c/Proposals/sehan.pdf.

Bennett, Roy, et al. "Support for Network Technologies in the MECCANO Tools and Performance characteristics of the MECCANO Systems and Their Effect on System Parameters"; (2000); pp. 1-33; http://www-mice.cs.ucl.ac.uk/multimedia/projects/meccano/deliverables/r5. 12/mec-r5. 12html.

Zhang, Lixia, et al. "RSVP: A New Resource ReSerVation Protocol"; IEEE Network (1993) pp. 8-18.

Wenger, Stephan "Temporal Scalability Using P-Pictures for Low-Latency Applications"; IEEE Signal Processing Society 1998 Workshop on Multimedia Signal Processing, Dec. 1998, Los Angeles, CA, USA; http://www.stewe.org/papers/mmsp98/243/index.htm.

European Search Report for EP Application No. 10 000 450.6-1241, dated Nov. 7, 2011; 6 pages.

EPO Search Report received in copending EP Application No. 17156552.6 dated Aug. 28, 2017, 10 pages.

* cited by examiner

METHOD AND SYSTEM FOR CONDUCTING VIDEO CONFERENCES OF DIVERSE PARTICIPATING DEVICES

CROSS-REFERENCE TO RELATED APPLICATIONS

This application is a divisional of U.S. patent application Ser. No. 13/869,781, entitled "Method and System for Conducting Video Conferences of Diverse Participating Devices," filed Apr. 24, 2013, which claims priority to U.S. Provisional Application Ser. No. 61/677,200, entitled "Method and System for Conducting Video Conference of Diverse Participating Devices," filed Jul. 30, 2012, all of which are incorporated by reference in their entirety herein.

This application is related to a U.S. Pat. No. 8,228,363, entitled "Method and System for Conducting Continuous Presence Conference," issued Jul. 24, 2012, the entire contents of which are incorporated herein by reference.

Further, this application is related to a U.S. application for a patent entitled "Method and System for Switching Between Video Streams in a Continuous Presence Conference," filed on Jun. 4, 2012 and assigned Ser. No. 13/487,703, the entire contents of which is incorporated herein by reference.

TECHNICAL FIELD

The present invention relates to audio/video communication and more particularly to the field of multipoint audio/video conferencing.

BACKGROUND ART

As traffic over Internet Protocol (IP) networks continues its rapid growth, with the growth of the variety of multimedia conferencing equipment, more and more people use multimedia conferencing as their communication tool. Today the multimedia conferencing communication can be carried over two types of communication methods, the legacy multimedia communication method and the new technique of media relayed communication method. As used herein, the terms: multimedia conference, video conference and audio conference may be understood as interchangeable, and the term video conference can be used as a representative term of them.

A legacy multipoint conference between three or more participants requires a Multipoint Control Unit (MCU). An MCU is a conference controlling entity that is typically located in a node of a network or in a terminal that receives several channels from endpoints. According to certain criteria, the MCU processes audio and visual signals and distributes them to a set of connected channels. Examples of MCUs include the MGC-100 and RMX® 2000, which are available from Polycom, Inc. (RMX is a registered trademark of Polycom, Inc.) A terminal, which may be referred to as a legacy endpoint (LEP), is an entity on the network, capable of providing real-time, two-way audio and/or audio-visual communication with another LEP or with the MCU. A more thorough definition of an LEP and an MCU can be found in the International Telecommunication Union ("ITU") standards, including the H.320, H.324, and H.323 standards, which can be found at the ITU website ww.itu.int.

A common MCU, referred to also as a legacy MCU, may include a plurality of audio and video decoders, encoders, and media combiners (audio mixers and/or video image builders). As used herein, the terms common MCU and legacy MCU can be considered interchangeable. The MCU may use a large amount of processing power to handle audio and video communication between a variable number of participants (LEPs). The communication can be based on a variety of communication protocols and compression standards and may involve different types of LEPs. The MCU may need to combine a plurality of input audio or video streams into at least one single output stream of audio or video, respectively, that is compatible with the properties of at least one conferee's LEP to which the output stream is being sent. The compressed audio streams received from the endpoints are decoded and can be analyzed to determine which audio streams will be selected for mixing into the single audio stream of the conference. As used herein, the terms decode and decompress should be understood as interchangeable.

A conference may have one or more video output streams wherein each output stream is associated with a layout. A layout defines the appearance of a conference on a display of one or more conferees that receive the stream. A layout may be divided into one or more segments where each segment may be associated with a video input stream that is sent by a certain conferee (endpoint). Each output stream may be constructed of several input streams, resulting in a continuous presence (CP) conference. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

A common MCU may need to decode each input video stream into uncompressed video of a full frame; manage the plurality of uncompressed video streams that are associated with the conferences; and compose and\or manage a plurality of output streams in which each output stream may be associated with a conferee or a certain layout. The output stream may be generated by a video output port associated with the MCU. A video output port may comprise a layout builder and an encoder. The layout builder may collect and scale the different uncompressed video frames from selected conferees into their final size and place them into their segment in the layout. Thereafter, the video of the composed video frame is encoded by the encoder and sent to the appropriate endpoints. Consequently, processing and managing a plurality of videoconferences require heavy and expensive computational resources and therefore an MCU is typically an expensive and rather complex product. Common MCUs are described in several patents and patent applications, for example, U.S. Pat. No. 6,300,973, 6,496,216, 5,600,646, or 5,838,664, the contents of which are incorporated herein by reference. These patents disclose the operation of a video unit in an MCU that may be used to generate the video output stream for a CP conference.

The growing trend of using video conferencing creates a need for low cost MCUs that will enable one to conduct a plurality of conferencing sessions having composed CP video images. This need leads to the new technique of Media Relay Conferencing (MRC).

In MRC, a Media Relay MCU (MRM) receives one or more streams from each participating Media Relay Endpoint (MRE). The MRM relays to each participating endpoint a set of multiple media streams received from other endpoints in the conference. Each receiving endpoint uses the multiple streams to generate the video CP image, according to a layout, as well as mixed audio of the conference. The CP video image and the mixed audio are played to the MRE's user. An MRE can be a terminal of a conferee in the session that has the ability to receive relayed media from an MRM and deliver compressed media according to instructions from an MRM. As used herein, the term endpoint may represent either an MRE or an LEP.

In some MRC systems, a transmitting MRE sends its video image in two or more streams; each of which can be associated with a different quality level. Such a system can use the plurality of streams to provide different segment sizes in the layouts, different resolution used by each receiving endpoint, etc. Further, the plurality of streams can be used for overcoming packet loss. The quality levels may differ in frame rate, resolution and/or signal to noise ratio (SNR), etc.

Today, MRC is becoming more and more popular. Further, more and more sources of video conferencing systems deliver a plurality of streams in parallel wherein the streams differ from each other by the quality of the compressed video. The quality level can be expressed in a number of domains, such as temporal domain (frames for second, for example), spatial domain (HD versus CIF, for example), and/or in quality (sharpness, for example). Video compression standards that can be used for multi-quality streams are H.264 AVC, H.264 annex G (SVC), MPEG-4, etc. More information on compression standards such as H.264 can be found at the ITU website www.itu.int, or at www.mpeg.org.

Common video compression methods involve using Intra and Inter frames. An Intra frame is a video frame that is compressed relative to information that is contained only within the same frame and not relative to any other frame in the video sequence. An Inter frame is a video frame that was compressed relative to information that is contained within the same frame, and also relative to one or more other frames in the video sequence.

Some of the multimedia multipoint conferencing sessions may involve some conferees having LEPs and some conferees having MREs. Such conferencing sessions need a gateway, an MCU, and an MRM.

A gateway can be adapted to control multipoint multimedia conferences involving one or more LEPs and one or more MREs. The gateway can be installed in an intermediate node between an MRM and one or more LEPs. In alternate embodiments, the gateway can be embedded within the MRM. In yet other embodiments, the gateway can be added to an LEP or to a common MCU that controls the LEP.

In the direction from the MRM to the LEP, a gateway can handle the plurality of audio streams that were relayed from the MRM, arrange them, and decode and mix the audio streams. The mixed audio stream can be encoded according to the audio compression standard used by the destination LEP and be sent to the LEP. In a similar manner, the received one or more compressed video streams can be arranged by the gateway, decoded, and composed into a CP image. The CP image can be encoded according to the video compression standard used by the destination LEP and be sent to the LEP.

In the other direction, from the LEP to the MRM, a gateway can be adapted to decode the video stream, scale the video stream (if needed) to one or more sizes, and compress each one of the scaled video images according to the compression standard used by the MREs that participate in the session. The compressed video stream that complies with the need of the MREs is sent toward the MRM. The compressed audio stream that is received from an LEP can be decoded and its energy level can be determined. The decoded audio can be compressed according to the compression standard used by the MREs, an indication on the audio energy can also be added, and the compressed audio that complies with the requirements of the MRM can be sent toward the MRM.

Control and signaling information received from the MRM, such as the one or more IDs assigned to an LEP, the layout assigned to the LEP, the selected audio streams to be mixed, or the presented streams and their segments, can be processed and used by the gateway. Other signaling and control can be translated and be sent to the LEP, for example call setup instructions. A reader who wishes to learn more about MRMs, MREs, and gateways between MRC and legacy conferencing systems is invited to read U.S. Pat. No. 8,228,363, the entire content of which is incorporated herein by reference.

Using three intermediate nodes (an MRM, a gateway, and an MCU) between an MRE and an LEP that participate in the same multimedia multipoint conferencing session results in negative impact on the experience of the conferees using either type of endpoint, MRE or LEP. Using a gateway in between adds latency to the traffic and reduces the quality of the media. The gateway typically adds additional decoding/scaling/encoding operations. Decoding, scaling, and encoding operations add delay and reduce the quality of the media because of the lossy nature of the decompression and compression standards.

Further, in a common MCU, decoders and encoders are typically allocated to a conferee as long as the conferee is connected to a session, independent of whether the conferee video image or voice is selected to be presented or heard by the other conferees. This allocation and the use of three intermediate devices for handling a conference session between an MRE and an LEP consume expensive resources.

The above-described deficiencies of the current situation do not intend to limit the scope of the inventive concepts of the present disclosure in any manner. The deficiencies are presented for illustration only.

SUMMARY OF INVENTION

A novel universal bridge (UB) can handle and conduct multimedia multipoint conferences between a plurality of MREs and LEPs without using an MRM, an MCU and a gateway. Further, a UB can be configured to allocate and release resources dynamically according to the current needs of each conferee and the session.

In one embodiment, a UB can comprise a media common interface (MCIF) that may carry streams of compressed media, streams of semi-compressed media and streams of decompressed media embedded in MCIF transport protocol (MCIFTP) frames. Each MCIFTP frame can have an MCIFTP header having an ID field that identifies the stream. In one embodiment of a UB, the MCIF can be a shared memory. In such an embodiment, the stream ID can represent a set of memory addresses. In another embodiment of a UB, the MCIF may be an Ethernet switch having multicast routing capabilities. In such an embodiment of a UB, the stream ID can be a field in the Ethernet header of the frame. In yet another embodiment of a UB, the MCIF can be a Time Division Multiplexing (TDM) bus. In such an embodiment, the stream ID can represent a time slot number. Other examples of UBs may use other types of MCIFs.

Semi-compression can be lossless compression such as but not limited to ZIP, Lempel-Ziv-Welch (LZW), lossless JPEG 2000, etc. In another embodiment, the semi-compression can be implemented by a partial H.264 encoding, without executing the lossless section, for example.

One embodiment of a UB can comprise banks of elements: a bank of LEP input network interface processors (LEPINIPs); a bank of MRE input network interface processors (MREINIPs); a bank of decoding modules (DMs); a bank of media combiner modules (MCMs); a bank of encoder output modules (EOMs); a bank of LEP output network interface processors (LEPONIPs), a bank of MRE output network interface processors (MREONIPs); and a control module (CM).

One embodiment of a UB can employ multiple processing units connected via the MCIF, for example a blade computer. Each blade can implement a combination of elements from the above banks.

An LEPINIP can obtain a stream of Internet Protocol (IP) packets that carries compressed media received from an LEP. Each obtained IP packet can be processed according to the Internet Protocol. In some embodiments, an LEPINIP may further process a Real Time Protocol (RTP) and Real Time Control Protocol (RTCP) headers. A reader who wishes to learn more about the RTP and RTCP protocols is invited to visit the Internet Engineering Task Force (IETF) website www.ietf.org. The media payload of each obtained packet, after being processed by the LEPINIP can be embedded in a MCIF frame according to the MCIFTP; and a stream of MCIFTP frames that carries compressed media received from an LEP is transferred toward the MCIF.

An MREINIP can obtain a stream of Internet Protocol (IP) packets that carries compressed media received from an MRE. Each obtained IP packet can be processed according to relevant communication protocols. The media payload of each obtained packet, after being processed by the MREINIP can be embedded in a MCIF frame according to the MCIFTP; and a stream of MCIFTP frames that carry compressed media received from an LEP is transferred toward the MCIF.

One embodiment of a DM can obtain a stream of MCIFTP frames carrying compressed media. The DM can decode the stream of MCIFTP frames and deliver a stream of MCIFTP frames that carry decoder module data units (DMDU) to the MCIF. In some embodiments, the DM can comprise one or more scalers. Each scaler can scale the decoded image into a required size and scaled DMDUs are embedded in MCIFTP frames. The size can be defined by the number of pixels in each direction, typically width over height (WxH).

In some embodiments of a UB, an MCM can obtain a plurality of streams of MCIFTP frames carrying DMDUs. The MCM can combine decompressed frames carried by the plurality of streams of MCIFTP frames into a CP video image and delivers a stream of MCIFTP frames carrying combined media of a CP video image that are targeted toward at least one LEP. In some embodiments of UB in which the DM does not comprise a scaler, the MCM may comprise a scaler for each obtained stream of MCIFTP frames carrying DMDUs. The scaler scales the size of the video image carried by the obtained stream to the appropriate size of a segment in the layout of the CP video image in which the obtained video image has to be placed.

One embodiment of an EOM can obtain a stream of MCIFTP frames carrying DMDUs. The DMDUs can be decompressed data units that were sent from an LEP, decoded by a DM and are targeted to an MRE, for example. Another source of DMDUs can be a MCM that delivers decompressed data units of a CP video image. One embodiment of an EOM can process the one or more streams of MCIFTP frames carrying DMDUs and deliver to the MCIF a stream of MCIFTP frames carrying compressed media. In some embodiments of a UB that employ a plurality of blade computers, an EOM may semi-compress a stream of MCIFTP frames carrying DMDUs that is targeted toward another blade computer.

Compression and decompression can be done according to compression standards such as but not limited to H.264 AVC, H.264 Annex G, MPEG-4, etc., which are well known in the art and will not be further described. In some embodiments in which the media is audio, the audio compression and decompression can be done according to compression standards such as but not limited to G.711, G.729, G.722.1C, G.719, etc. More information on compression standards can be found at the ITU website www.itu.int, or at www.mpeg.org.

One embodiment of an MREONIP may obtain one or more streams of MCIFTP frames that carry compressed media originating from an MRE or an LEP, process the one or more streams according to the relevant communication protocol such as an RTP. One embodiment of an RTP that can be used for transferring compressed media to an MRE is described in U.S. Pat. No. 8,228,363. The IP packets carrying compressed media can be sent toward one or more MREs.

One embodiment of the CM controls the communication session between the plurality of LEPs, MREs, and the UB. The CM may further control the data traffic to and from the MCIF and allocate the ID for each stream. In addition, the CM may allocate the resources that are needed for each session and associate the relevant resources to the relevant MREs or LEPs. In some embodiments of a UB, the CM may be configured to allocate some of the resources dynamically according to the current needs of the session.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

Embodiments of the present invention will be understood and appreciated more fully from the following detailed description, taken in conjunction with the drawings in which.

DESCRIPTION OF EMBODIMENTS

Turning now to the figures, in which like numerals represent like elements throughout the several views, embodiments of the present disclosure are described. For convenience, only some elements of the same group may be labeled with numerals. The purpose of the drawings is to describe embodiments and not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a standalone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. As used herein, the terms task, method, and process can be understood as interchangeable.

Figure 1:
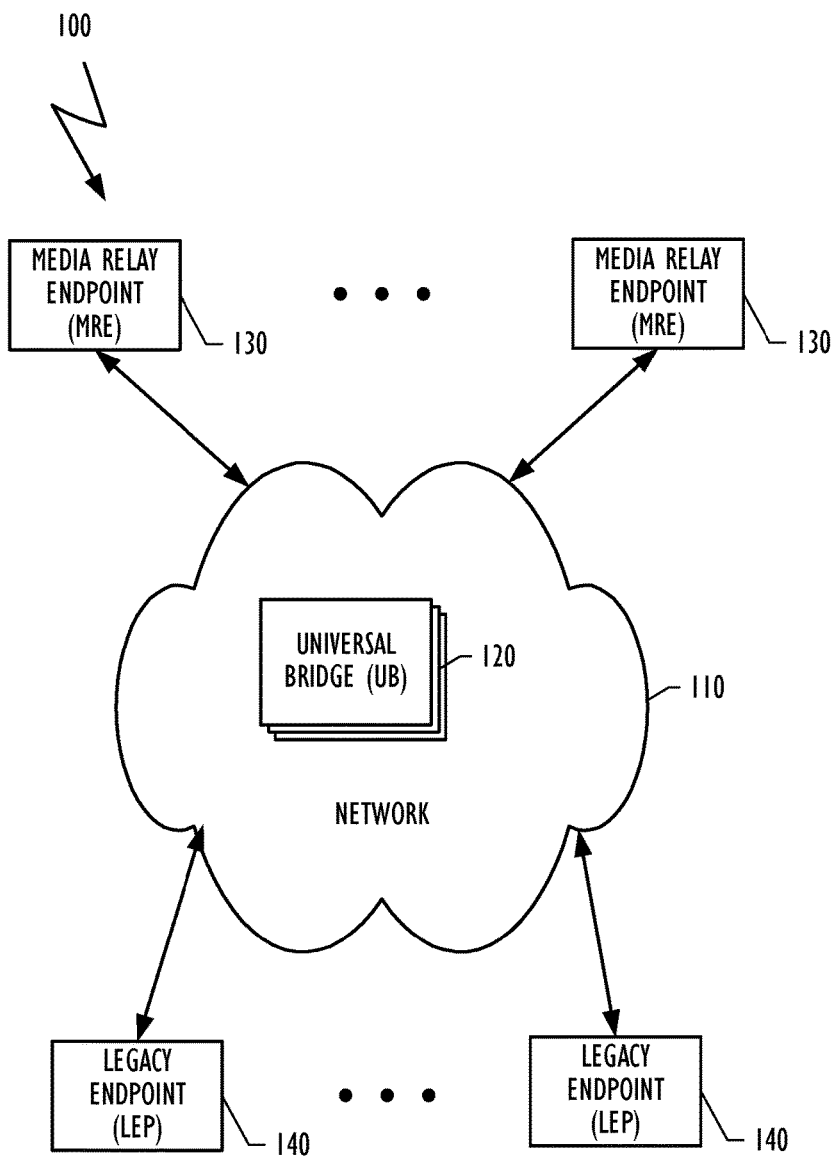
FIG. 1 illustrates an embodiment of a novel multimedia conferencing system 100 comprising a variety of novel electronic videoconferencing systems.

FIG. 1 illustrates a novel multimedia conferencing system 100, according to an embodiment of the present disclosure. System 100 can include a network 110, one or more UBs 120, a plurality of MREs 130, and a plurality of LEPs 140. Network 110 can be, but is not limited to, a packet switched network, a circuit switched network, an IP network, or any combination thereof. The multimedia communication over the network can be based on communication protocols such as but not limited to H.320, H.323, SIP, and may use media compression standards such as but not limited to H.263, H.264, G.711, G.719. As used herein, the terms data chunks, frames, and packets may be understood as interchangeable.

Each MRE 130 is capable of providing real-time, two-way audio and/or visual communication to another MRE 130 or to the UB 120. An MRE 130 can be a terminal of a conferee in the session, which has the ability to receive relayed compressed media (audio and/or video) from a UB 120 and deliver relay compressed media data chunks according to instructions from the UB 120. The relay and relayed compressed media, audio or video, data chunks can be RTP compressed media data chunks. Each MRE 130 can send relay RTP compressed audio data chunks in the appropriate required bit rate or rates and the required compression standard. Similarly, each MRE 130 can send relay RTP compressed video data chunks in the appropriate required size or sizes, bit rate or rates, quality, and the required compression standard. In one embodiment, each MRE 130 can be adapted to send an indication of its audio energy by embedding the audio energy indication in a field in the header or in an Extension header of the relay RTP compressed audio data chunks.

In a CP video conference, an MRE 130 can receive a plurality of relayed RTP compressed video streams of data chunks of the video images originated from selected conferees. Each video image can fit in the appropriate layout segment of the CP image that is associated with that image. MRE 130 can decode each of the received relayed RTP compressed video streams, combine the decoded video images into a CP video image by placing each decoded image in the appropriate segment of the layout. The CP video image can be transferred to a display to be presented to a conferee that is using the MRE 130.

In addition, the MRE 130 can receive relayed RTP compressed audio streams of audio data chunks. The MRE 130 can decode the received relayed RTP compressed audio streams of audio data chunks, mix the different decoded audio streams and transfer the mixed audio to the MRE 130 loudspeakers. In the other direction, the MRE 130 can deliver relay RTP compressed audio and video data chunks according to the instructions from the UB 120.

The LEP 140 is a common video conference terminal that is an entity on the network 110, capable of providing real-time, two-way audio and/or audio visual communication with another LEP 140 or with an MCU (not shown in FIG. 1).

One embodiment of a UB 120 can handle and conduct multimedia multipoint conferences between a plurality of MREs 130 and LEPs 140 without using an MRM, and/or an MCU and/or a gateway. Further, a UB 120 can be configured to allocate and release resources dynamically according to the current needs of each conferee and the session.

One embodiment of a UB 120 can be a centralized UB (CUB). A CUB can have a centralized architecture and can be located in an intermediate node of network 110 between the plurality of MREs 130 and the plurality of LEPs 140. In another example, a UB 120 can be a decentralized UB (DCUB) having decentralized architecture. ADCUB can comprise a plurality of processing entities located in an intermediate node of network 110 between a plurality of MREs 130 and a plurality of LEPs 140. In some embodiments of a DCUB, each processing entity or group of processing entities can execute a portion of the functionality of the UB 120. In yet other embodiments each one of the plurality of processing entities can execute the entire functionality of a UB 120 and the plurality of processing entities can share the load.

An embodiment of a UB 120 can comprise an MCIF that may carry streams of compressed media, streams of semi-compressed media, and streams of decompressed media embedded in MCIFTP frames. Each MCIFTP frame can have an MCIFTP header having an ID field that identifies the stream. In a CUB, the MCIF can be an internal common interface. In a DCUB the MCIF can comprise an internal MCIF and an external MCIF. The internal MCIF of a processing entity can connect the internal modules of that processing entity and the external MCIF can connect the plurality of processing entities that compose the DCUB. An MCIF adaptor can be used in order to associate the external and the internal MCIF into the MCIF of the DCUB.

In some embodiments of a UB 120, the MCIF can be a shared memory. In such an embodiment, the stream ID can represent a set of memory addresses. In another embodiment of a UB 120, the MCIF can be an Ethernet switch having multicast routing capabilities. In such an embodiment of a UB 120, the stream ID can be a field in the Ethernet header of a frame. In yet another embodiment of a UB 120, the MCIF can be a TDM bus. In such an embodiment, the stream ID can represent a time slot number. Other embodiments of a UB may use other types of common interfaces or any combination of the above types of common interfaces. More information on the operation of embodiments of UB 120 is described below in the discussion of FIGS. 2-5B.

Figure 2:
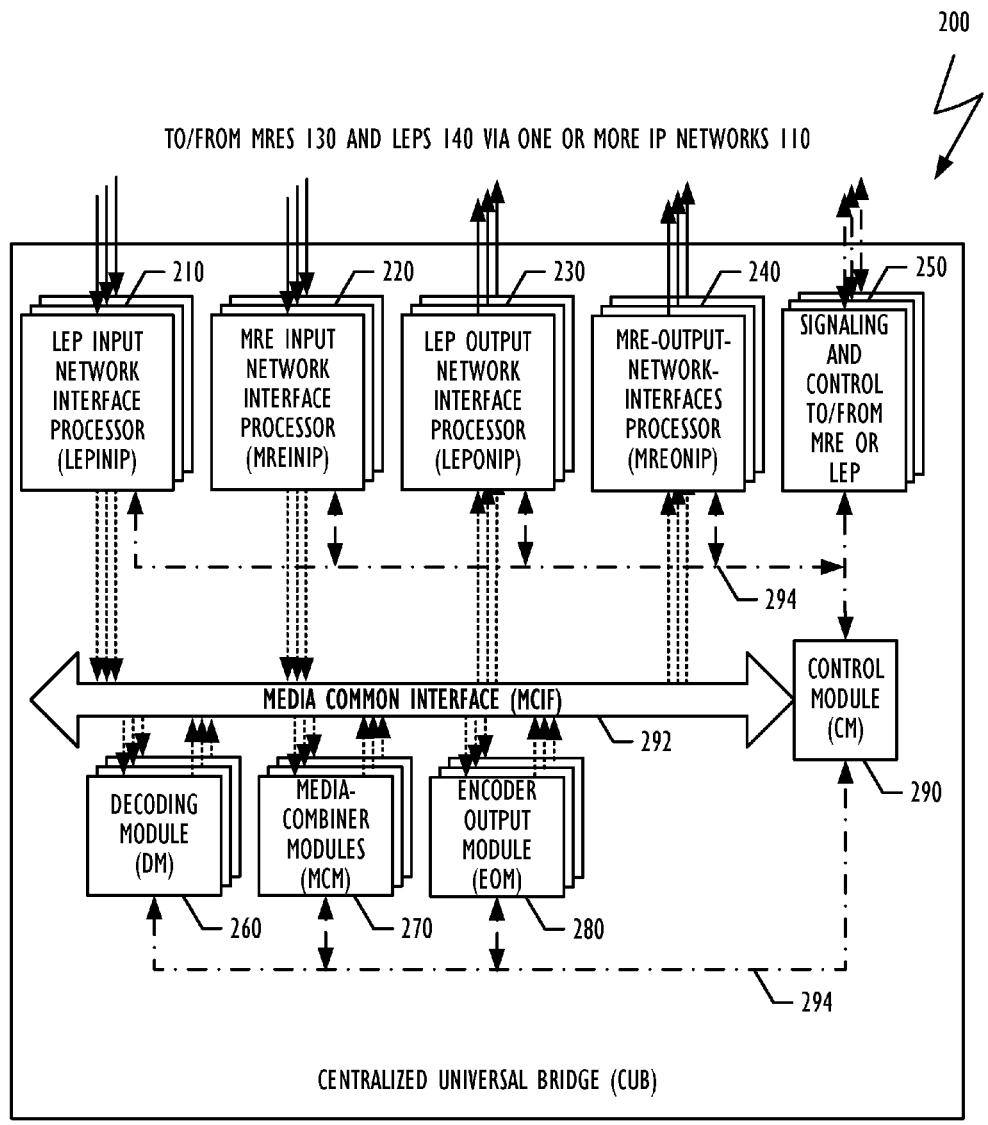
FIG. 2 depicts a simplified block diagram with relevant elements of one embodiment of a centralized universal bridge (CUB).

FIG. 2 depicts a simplified block diagram with relevant elements of one embodiment of a CUB 200. A CUB 200 can comprise an MCIF 292; a bank of LEPINIPs 210; a bank of MREINIPs 220; a bank of LEPONIPs 230; a bank of MREONIPs 240; a bank of signaling and control modules to/from MRE or LEP 250; a bank of DMs 260; a bank of MCMs 270; a bank of EOMs 280; and a CM 290 that controls the operation of the CUB 200 via the control bus 294. As used herein, the term 'bank' represents a group of a plurality of resources from a certain type. Each of the resources can be allocated by the CM 290 as needed. Each allocated resource can be associated with one or more internal modules of CUB 200 via the MCIF 292 as well as with one or more of the LEPs or MREs that are currently connected to a multimedia multipoint conference.

One embodiment of LEPINIP 210 can be associated with an LEP and can obtain a stream of Internet Protocol (IP) packets that carry compressed media received from the associated LEP 140. The compressed media can be audio and/or video. Each obtained IP packet can be processed according to the Internet protocol for example. In some embodiments, an LEPINIP 210 may further process the RTP and RTCP headers. The media payload, compressed audio or compressed video of each obtained packet, after being processed by the LEPINIP 210 can be embedded in a MCIF frame according to the MCIFTP; and a stream of MCIFTP frames that carries compressed media received from an LEP 140 is transferred toward the MCIF.

When an LEP 140 joins a video conference, a CM 290 may allocate one LEPINIP 210 for handling the compressed video stream received from that LEP and one LEPINIP 210 for handling the compressed audio received from that LEP. Each LEPINIP 210 may receive a stream ID (SID) that is associated with the received compressed video or audio stream handled by that LEPINIP 210. CM 290 can manage a map of all the SIDs and the allocated resources and information how to route each stream to the appropriate resource.

The allocated SID is used to mark the MCIFTP frames of that stream while they are traveling over the MCIF 292. The marking technique used for each stream traveling over the MCIF depends on the type of the MCIF 292. For example, if the MCIF is a shared memory, LEPINIP 210 may get from the CM 290 an interval of addresses in the shared memory into which the LEPINIP 210 may write (store) each received compressed data chunk in a cyclic mode, for example. If the MCIF 292 is a TDM bus, then the LEPINIP 210 may get the time slot number that is associated to that SID, etc.

Each allocated LEPINIP 210, based on information received from the CM 290 can set an RTP connection with the relevant LEP for carrying the compressed media, video or audio, and an RTCP connection for carrying packets of real-time control protocol that are related to the RTP connection. Each received packet that carries compressed media, over the RTP connection, is processed according to the IP protocol and the RTP protocol to obtain data chunks of compressed media. Then, the compressed media data chunks can be organized in MCIFTP frames according to the structure of the MCIF 292 and the value of the SID can be added as part of the header of the MCIFTP frames. The MCIFTP frames can be transferred to the MCIF 292 via a buffer for example. If the MCIF 292 is a shared memory, each MCIFTP frame can be stored in a cyclic mode in the section of the shared memory that is allocated to that SID, for example.

In some embodiments (not shown in the figures) the LEPINIP 210 may further comprise a DM. The DM may include one or more scalers. In such an embodiment, each received packet that carries compressed media, originated from a LEP over an RTP connection, is processed according to the IP protocol and the RTP protocol to obtain data chunks of compressed media. The compressed media data chunks can then be decoded with or without scaling by the DM. The DMDUs can be organized in MCIFTP frames according to the structure of the MCIF 292 and the value of an SID can be added as part of the header of the MCIFTP frames. In embodiments in which the DM comprises one or more scalers, the SID can be associated with a scaler. The MCIFTP frames that carry DMDUs may be transferred to the MCIF 292 via a buffer. If the MCIF 292 is a shared memory, each MCIFTP frame may be stored in a cyclic mode in the section of the shared memory that is allocated to that SID.

In alternate embodiments (not shown in the figures) of LEPINIP 210 that include a DM, the DM may further comprise a lossless encoder. The lossless encoder may be used for compressing, using a lossless algorithm, decoded media (audio or video) that is uncompressed that needs to be transferred over the MCIF 292. A lossless decoder may be used by an element that collects the DMDUs. The lossless encoder and decoder can use a lossless compression algorithm such as but not limited to GZIP, Lempel-Ziv-Welch (LZW), lossless JPEG 2000, etc. In another embodiment, the lossless compression can be implemented by a partial H.264 encoding, without executing the lossless section, for example. As used herein, the terms semi-compression and lossless compression may be understood as interchangeable.

An MREINIP 220 can be associated with an MRE 130 and can obtain a stream of IP packets that carry compressed media received from the associated MRE 130. The compressed media can be audio and/or video. Each obtained IP packet can be processed according to the Internet protocol for example. The RTP media payload, relay RTP compressed audio or compressed video data chunks, of each obtained packet, after being processed by the MREINIP 220 can be embedded in an MCIF frame according to the MCIFTP; and a stream of MCIFTP frames that carries relay RTP compressed media received from an MRE 130 is transferred toward the MCIF 292.

When an MRE 130 joins a video conference, a CM 290 may allocate one or more MREINIPs 220 for handling the one or more streams of compressed video received from that MRE 130. Each compressed video stream can be in a different resolution (size), quality, etc. In addition one or more MREINIPs 220 can be allocated for handling the one or more compressed audio streams received from that MRE 130. Each MREINIP 220 may receive a stream ID (SID) that is associated with the received compressed video or audio stream handled by that MREINIP 220.

The allocated SID is used to mark the MCIFTP frames of that stream while they are traveling over the MCIF 292. Information how to route each stream over the MCIF 292 depends on the type of the MCIF 292. For example, if the MCIF 292 is a shared memory, MREINIP 220 may get from the CM 290 an interval of addresses in the shared memory into which the MREINIP 220 may write (store) each MCIFTP frame in a cyclic mode. If the MCIF 292 is a TDM bus then the MREINIP 220 may get the time slot number that is associated to that SID, etc.

Each allocated MREINIP 220, based on information received from the CM 290 via control bus 294 can set an RTP connection with the relevant MRE 130 for carrying the compressed media, video or audio, and an RTCP connection for carrying packets of real-time control protocol that are related to the RTP connection. Each received packet that carries compressed media over the RTP connection is processed according to the IP protocol to obtain relay RTP data chunks of compressed media. Then the RTP compressed media data chunks can be organized in MCIFTP frames according to the structure of the MCIF 292 and the value of the relevant SID can be added as part of the header of the MCIFTP frames. The MCIFTP frames can be transferred to the MCIF 292 via a buffer for example. If the MCIF 292 is a shared memory each MCIFTP frames can be stored in a cyclic mode in the section of the shared memory that is allocated to that SID, for example. If the MCIF 292 is an Ethernet LAN, then each MCIFTP frames can associate the SID with the destination address of the Ethernet header. In embodiments in which the Ethernet LAN has multicast capabilities, the SID can be associated with the multicast address.

When an LEP 140 joins a video conference, a CM 290 may allocate one LEPONIP 230 for handling the compressed CP video image that is transmitted toward that LEP and one LEPONIP 230 for handling the compressed audio mix that is sent toward that LEP. Each LEPONIP 230 may receive SID that is associated with the compressed video or audio MCIFTP frames that need to be obtained from the MCIF 292 by the relevant LEPONIP 230. Each allocated LEPONIP 230, based on information received from the CM 290, can establish an RTP connection with the relevant LEP 140 for carrying the compressed media, video or audio, and an RTCP connection for carrying packets of real-time control protocol that are related to the RTP connection.

An LEPONIP 230 can obtain from MCIF 292 a stream of MCIFTP frames that carries compressed media received from an EOM 280 that is associated with the relevant LEP 140. The compressed media can be mixed audio or CP video image generated by an appropriate MCM 270. The techniques used for obtaining the appropriate MCIFTP frames from the MCIF 292 depend on the type of the MCIF 292 and include shared memory, TDM bus, Ethernet, etc.

The LEPONIP 230 can process each obtained MCIFTP frame to retrieve the compressed media embedded within the frame. The processing of an MCIFTP frame can comprise removing the header of the MCIFTP frame, for example. The media payload of each processed MCIFTP frame can be adapted to comply with RTP to create RTP compressed media data chunks. An RTP header with appropriate fields can be added. Fields of the RTP header can reflect the source of that stream (SSRC), the payload type (PT), which reflects the media as well as the encoder, sequence number, time stamp, etc. The RTP data chunks can be processed according to the IP protocol in order to be embedded within an IP packet. An IP header can be added to the packet. The source IP address and port of the header can reflect the relevant LEPONIP 230. The destination IP address can reflect the associated LEP 140 and the port number that is associated with that media type. The IP packet can be sent toward the associated LEP 140. In some embodiments or in some sessions the IP packets can be sent toward a plurality of LEPs 140 that share the same compression standard and the same audio mix, or CP video image.

When an MRE 130 joins a video conference, a CM 290 may allocate one or more MREONIPs 240 for handling relayed RTP compressed video images that are transmitted toward that MRE 130 to be included in the CP video image. In one embodiment of a CUB 200, the relayed RTP compressed video data chunks of presented MREs 130 or LEPs 140 can be transmitted over a single RTP connection between the CUB 200 and the relevant MRE 130. In such an embodiment, a single MREONIP 240 can be allocated for handling the compressed video of the CP image transmitted toward that MRE 130.

In another embodiment CUB 200 the relayed RTP compressed video data chunks of each presented MRE 130 or LEP 140 can be transmitted over a separate RTP connection between the CUB 200 and the relevant MRE 130. In such an embodiment, a plurality of MREONIPs 240 can be allocated for the relayed compressed video streams, one for each RTP connection. Each MREONIP 240 can handle relayed RTP compressed video data chunks originated by one of the presented MRE 130 or LEP 140.

In a similar way, one or more MREONIPs 240 can be allocated for handling the relayed RTP compressed mixed audio that is transmitted toward that MRE 130. For each RTP connection that carries compressed media (audio/video) an RTCP connection can be established for carrying packets of real-time control protocol that are related to the RTP connection.

During the allocation process, each allocated MREONIP 240 may receive an indication about an SID value from CM 290. The indicated SID can be associated with MCIFTP frames that carry relayed RTP compressed video/audio data chunks that need to be obtained from the MCIF 292 by the relevant MREONIP 240. The indicated SID can be used by the relevant MCM 270 that organizes MCIFTP frames carrying relayed RTP compressed video/audio data chunks.

An MREONIP 240 can obtain, from the CM 290, SID values of one or more compressed relayed streams to be collected from the MCIF 292. The number of streams depends on whether the relayed compressed media of a CP image or a mixed audio is sent over a single RTP connection or a plurality of RTP connections. The one or more streams of MCIFTP frames that carry compressed media are received from an MCM 270 that is associated with the relevant MRE 130. Obtaining the appropriate MCIFTP frames from the MCIF 292, based on the received SID values, depends on the type of the MCIF 292: shared memory, TDM bus, Ethernet, etc.

An embodiment of an MREONIP 240 can process each obtained MCIFTP frame and retrieve the compressed media embedded within the frame. Processing an MCIFTP frame can comprise removing the header of the MCIFTP frame, for example. The media payload of each processed MCIFTP frame can be adapted to comply with RTP to create an RTP compressed media data chunk. An RTP header with appropriate fields can be added. Fields of the RTP header can reflect the source of that stream (SSRC), the payload type (PT) which reflects the media as well as the encoder, sequence number, time stamp, etc. The RTP data chunks can be processed according to the Internet protocol in order to be embedded within an IP packet. An IP header can be added to the packet. The source IP address and port of the header can reflect the relevant MREONIP 240. The destination IP address can reflect the associated MRE 130 and the port number that is associated with that media type. The IP packet can be sent toward the associated MRE 130. In some embodiments or in some sessions, the IP packets can be sent toward a plurality of MREs 130 that share the same compression standard and the same audio mix, or CP video image.

One embodiment of a signaling and control to/from MRE or LEP processor 250 can be allocated, by CM 290, for an MRE 130 or LEP 140 when the endpoint is connected to the CUB 200. The signaling and control module 250 is used for establishing the communication session and connecting the relevant endpoint to the conference. A CM 290, via the relevant signaling and control module 250, can authenticate the endpoint and the relevant conference session. After authentication, a negotiation stage can be initiated in order to define the type of the endpoint, the capabilities of the endpoint, defining the compression standards, bit rate, etc. In addition, a layout that describes the CP video image, a forced speaker, etc., for that endpoint, can be defined. The negotiation can be based on H.323 or SIP, for example, which are well known in the art and will not be further discussed.

Three types of media processors can be included in a CUB 200. The first one is decoding module DM 260 that decodes (decompresses) compressed media, audio or video. The second one is MCM 270 that combines media received from two or more endpoints into combined media to be transmitted toward one or more endpoints via the MCIF 292. An MCM 270 that combines audio can mix audio received from one or more endpoints. An MCM 270 that combines video can combine video images received from two or more presented endpoints to be combined into a CP image. The third type of media processor can comprise an EOM 280 that encodes (compresses) decoded media, audio or video.

Each one of the three types of media processors, DM 260, MCM 270, and EOM 280, can comprise two sections (not shown in the drawings): an MCIF section and a media section. The MCIF section of the three types of media processors can be similar. One embodiment of an MCIF section can be configured to obtain the relevant one or more streams of MCIFTP frames from the MCIF 292, process the header of the MCIFTP frames, organize the media payload, and deliver the media payload toward the media section. In the other direction, an MCIF section can be configured to obtain the processed media data from the media section, organize the media as payload of MCIFTP frames, add the appropriate header to mark the one or more streams of MCIFTP frames and deliver the MCIFTP frames toward the MCIF 292.

After allocating a media processor, whether a DM 260, a MCM 270, or a EOM 280, the MCIF section of the allocated media processor may receive from CM 290 two SID values. An input SID value and an output SID value. The input SID value can represent a stream of compressed media MCIFTP frames to be obtained from MCIF 292, as the input to the allocated media processor, to be processed by the media processor. The output SID value can represent a stream of processed media MCIFTP frames at the output of the allocated media processor to be delivered via the MCIF 292 toward one or more of the internal modules of the CUB 200. The type of the SID and the way to obtain and transmit MCIFTP frames over the MCIF 292 depend on the type of MCIF (shared memory, TDM bus, etc.) are described above and will not be further described.

In one embodiment of CUB 200, a DM 260 can be allocated for the entire session, by the CM 290, for each compressed media stream of MCIFTP frames that is carried over the MCIF 292 and is delivered from an MRE 130 or LEP 140 via a MREINIP 220 or LEPINIP 210 (respectively).

In another embodiment of a CUB 200, a DM 260 can be allocated as needed, by the CM 290, for each compressed media stream of MCIFTP frames that is carried over the MCIF 292 and was received from an LEP 140 via a LEPINIP 210 that is currently presented in a CP video image that will be combined and delivered toward one of the LEPs 140 or MREs 130. A DM 260 may also be allocated for each compressed media stream of MCIFTP frames that is carried over the MCIF 292 and was received from an MRE 130 via an MREINIP 220 that is currently presented in a CP video image that will be combined and delivered toward one of the LEPs 140. In such an embodiment, each time a DM 260 is allocated, an Intra frame can be requested from the relevant MRE 130 or LEP 140.

A MCIF section of an allocated DM 260 may receive from the CM 290 two SID values: an input SID value that can represent a stream of compressed media MCIFTP frames to be obtained from MCIF 292, as the input to the allocated DM 260, to be decoded by the DM 260; and an output SID value that represents a stream of decoded media MCIFTP frames as the output stream of the allocated DM 260, to be delivered via the MCIF 292 toward one or more of the MCM 270 or EOM 280. The allocated media section of the DM 260 is configured to comply with the compression standard used to compress the input stream to the allocated DM 260. The compression standard can be such as but not limited to H.264, for compressed video, or G.729 for compressed audio.

During operation, an MCIF section of the DM 260 can obtain, from the MCIF 292, MCIFTP frames of compressed media that are associated with the input SID value. Each frame can be processed in order to organize the frames according to their sequence and time stamp. The frame header can be removed and the compressed media payload (audio or video) can be delivered toward the media section of DM 260, which is a media decoder. The media decoder decodes the compressed media into a decoded stream, audio or video depending on the type of the relevant compressed stream. Decoding of compressed audio or video is well known in the art and will not be further described. In case that the media handled by the relevant DM 260 is audio, a DM 260 may periodically determine the audio energy of the decoded audio stream and deliver this parameter to CM 290 via control connection 294.

The decoded media stream can be transferred to the MCIF section of the allocated DM 260. The MCIF section may arrange the decoded media stream into MCIFTP frames associated with the output SID value that was allocated to that DM 260. The MCIFTP frames are created according to the type of the MCIF 292. The MCIFTP frames can be delivered as the output stream of the DM 260 that carries MCIFTP frames of DMDUs over the MCIF 292.

In some embodiments of a CUB 200, a video section of DM 260 can comprise one or more scalers. Each scaler can scale the decoded image into a required size. In such an embodiment, a plurality of output SID values can be allocated to the MCIF section of that DM 260. Each output SID value can be associated with a scaler. At the MCIF section, the scaled DMDUs are embedded in MCIFTP frames associated with the relevant output SID and be delivered as separate streams to the MCIF 292. The output size of each scaler can be defined by the number of pixels in each direction, width over height (WxH). The operation of a scaler of a video image is well known in the art and will not be further described.

An embodiment of a CUB 200 may comprise a plurality of types of MCM 270. The type of an MCM 270 can depend on the type of media, audio or video, and the type of an endpoint, to which the combined media is targeted, an LEP 140 or an MRE 130. As described above, an MCM 270 can comprise an MCIF section and a media section. The MCIF section of an MCM 270 can operate in a similar way to the ones that are described above, with a different number of allocated input and output SID values. The MCIF section of an allocated MCM 270 may receive a plurality of input SID values. Each one of the input SID values represents a stream that originated from an endpoint that was selected by CM 290, for example, to be presented or heard by the targeted endpoint. Thus, the input SID values can be changed during the conference session according to the dynamics of the session, when a speaker is changed or a presented conferee is changed, etc. According to the currently allocated input SID values, the MCIF section obtains, from the MCIF 292, MCIFTP frames of the selected streams, organizes the obtained frames in streams, and delivers the media payload of each stream toward the media combiner at the media section of MCM 270.

On the other direction, one or more streams of combined media from the media section of MCM 270 can be organized as payload of MCIFTP frames by the MCIF section of MCM 270. A header with the appropriate output SID value can be added to the combined media payload to create an MCIFTP frame, which is delivered to the MCIF 292.

One embodiment of a video MCM 270 that is configured to create a CP video image targeted toward an LEP 140 can have an MCIF section that can obtain, based on the current allocated input SID values, a plurality of streams of MCIFTP frames carrying video DMDUs. The obtained MCIFTP frames of video DMDUs were delivered to the MCIF 292 by the plurality of video DMs 260. Each video DM 260 is associated with a currently selected presented LEP 140 or MRE 130. Thus, the output SID value of a stream that was delivered by a certain video DM 260 can be similar to an input SID value of the video MCM 270 that points at that stream. In another embodiment of a CUB 200, the values of the output SID of a stream that was delivered by a certain video DM 260 and the input SID value of the MCM 270 that points at that stream can be different. In such an embodiment, a SID converting table can be rendered to the video MCM 270 for associating the two different SID values. The MCIF section can process the received MCIFTP frames of the selected streams, organize the obtained frames in streams, and deliver the DMDUs of each stream toward a CP image builder at the media section of video MCM 270.

The CP image builder can combine the decoded video data of the selected video images into a CP video image and deliver a stream of decoded CP image data units to the MCIF section of the video MCM 270. The MCIF section may organize the decoded CP image data units into MCIFTP frames, add a header comprising the allocated output SID value, and deliver the stream of MCIFTP frames toward at least one targeted LEP 140 via a video EOM 280 and LEPONIP 230. In some embodiments of a CUB 200, in which the video DM 260 does not comprise a scaler, the CP image builder may comprise a scaler for each selected stream of MCIFTP frames carrying DMDUs. The scaler scales the size of the video image carried by each selected stream to an appropriate size of the segment in the layout of the CP video image in which the obtained video image has to be placed. The operation of the CP image builder and a scaler is well known in the art and will not be further described.

One embodiment of an audio mixer MCM 270 that is configured to mix a plurality of audio streams to be sent toward at least one targeted LEP 140 can have a MCIF section that can obtain, based on the current allocated input SID values, a plurality of streams of MCIFTP frames carrying DMDUs, which are decoded audio data units. The obtained MCIFTP frames of DMDUs were delivered to the MCIF 292 by the plurality of audio DMs 260. Each audio DM 260 is associated with a currently selected heard LEP or MRE. Thus, the output SID value of a stream that was delivered by a certain audio DM 260 can be similar to an input SID value of the MCM 270 that points at that stream. In another embodiment of a CUB 200, the values of the output SID of an audio stream that was delivered by a certain audio DM 260 and the input SID value of the audio mixer MCM 270 that points at that stream can be different. In such an embodiment, a SID converting table can be rendered to the MCM 270 for associating the two different SID values. The MCIF section can process the received MCIFTP frames of the selected streams, organize the obtained frames in audio streams, and deliver the DMDUs of each audio stream toward an audio mixer at the media section of MCM 270.

The audio mixer can mix the decoded audio data of the selected audio streams into decoded mixed audio and deliver a stream of decoded mixed audio data units to the MCIF section of the audio MCM 270. The MCIF section may organize the decoded mixed audio data units into MCIFTP frames, add a header comprising the allocated output SID value, and deliver the mixed audio stream of MCIFTP frames toward at least one targeted LEP 140 via an audio EOM 280 and LEPONIP 230. The operation of an audio mixer is well known in the art and will not be further described.

Another type of MCM 270, a relayed video MCM 270, can be used in order to convert two or more selected relay RTP compressed video streams into one or more relayed RTP compressed video streams to be transmitted toward one or more MREs 130. Each MRE 130 can build and present a CP video image from received the transmitted one or more relayed RTP compressed video streams.

One embodiment of a relayed video MCM 270 can have a MCIF section that obtains, based on current allocated input SID values, a plurality of selected streams of MCIFTP frames carrying relay RTP compressed video data chunks. The obtained MCIFTP frames of relay RTP compressed video data chunks were delivered to the MCIF 292 by one or more MREINIP 230, each associated with a currently selected MRE 130, or from one or more EOM 280, each associated with a currently selected LEP 130. Thus, the output SID value of a stream that was delivered by a selected EOM 280 or a selected MREINIP 230 can be similar to an input SID value of the relayed video MCM 270 that points at that stream. In another embodiment of a CUB 200, the values of the output SID of a stream that was delivered by a selected EOM 280 or MREINIP 230 and the input SID value of the relayed video MCM 270 that points at that stream can be different. In such an embodiment, a SID converting table can be rendered to the relayed video MCM 270 for associating the two different SID values. The MCIF section can process the received MCIFTP frames of the selected streams, organize the obtained frames in streams, and deliver the relay RTP compressed video data chunks of each stream toward a Session Compressed Video RTP Processor (SCVRP) at the media section of the relayed video MCM 270.

An SCVRP can receive the relay RTP compressed video data chunks of each stream (RTP header and compressed video payloads) from the MCIF section of the relayed video MCM 270. The SCVRP can manage a plurality of sequential memories, one for each selected MRE 130 or LEP 140. The SCVRP can parse the header of the received relay RTP compressed video data chunks and store it in the appropriate sequential memory according to its frame number or time stamp, for example. From time to time, depending on the frame rate used by the session, according to signaling and control information received from CM 290, the SCVRP can access a group of the one or more sequential memories and convert the compressed data of the group of selected endpoints into relayed RTP compressed video data chunks that are transferred toward the MCIF section of that relayed video MCM 270. A reader who wishes to learn more about the operation of an SCVRP is invited to read the U.S. Pat. No. 8,228,363, the content of which is incorporated herein by reference.

The MCIF section of the relayed video MCM 270 may organize the relayed RTP compressed video data chunks into MCIFTP frames, add a header comprising the allocated output SID value and deliver the stream of MCIFTP frames toward at least one target MRE 130 via an MREONIP 240. In other embodiments of a CUB 200, an MCIF section may organize the relayed RTP compressed video data chunks into a plurality of output streams of MCIFTP frames, where each output stream originates from a selected LEP 140 or MRE 130 and carries a video image in the scaled size of the segment allocated to that selected endpoint (MRE 130 or LEP 140). For each output stream the MCIF section may add a header comprising an allocated output SID value, for that stream, and deliver the stream of MCIFTP frames toward at least one target MRE via an MREONIP 240.

Another type of MCM 270 can be referred to as a relayed audio MCM 270. One embodiment of a relayed audio MCM 270 can be used in order to convert two or more selected relay RTP compressed audio streams into one or more relayed RTP compressed audio streams to be transmitted toward one or more MREs 130. Each MRE 130 can decode, mix, and play the mixed audio by receiving the transmitted one or more relayed RTP compressed audio streams. The operation of a relayed audio MCM 270 can be understood by skilled person in the art from the above description of the relayed video MCM 270, in which the media is changed from video to audio and the SCVRP is replaced by a Session Compressed Audio RTP Processor (SCARP). A reader who wishes to learn more about the operation of an SCARP is invited to read U.S. Pat. No. 8,228,363, the content of which is incorporated herein by reference.

The EOM 280 is another media processor that is related to the embodiment of the CUB 200 that is illustrated in FIG. 2. The CUB 200 may comprise a plurality of types of EOMs 280. The type of an EOM 280 can depend on the type of media, audio, or video, and the type of endpoint to which the encoded (compressed) media is targeted, an LEP 140 or an MRE 130. As described above, an EOM 280 can comprise an MCIF section and a media section. The MCIF section of an EOM 280 can operate in a similar way to the ones that are described above, with additional functionality and a different number of allocated input and output SID values.

The MCIF section of an allocated EOM 280 that is associated with an LEP 140 (a target LEP 140) may receive an input SID value that represents a stream of MCIFTP frames that carry decoded composed media that is targeted toward that LEP 140. This stream can be composed by an MCM 270 that is related to that LEP 140. The MCM 270 can be a CP video image builder for video or an audio mixer for audio. According to the currently allocated input SID values, the MCIF section may obtain, from the MCIF 292, MCIFTP frames of the selected streams, organize the obtained frames, and deliver the decoded combined media payload toward a media encoder at the media section of EOM 280. For an audio stream the media encoder can comply with the audio compression standards used by the target LEP 140. Example of audio compression standards can be G.711, G.729, G.722.1C, G.719, etc. The media encoder for video can comply with compression standards such as but not limited to H.263, H.264.

In the other direction, the compressed media stream from the media section of EOM 280 can be organized as the payload of MCIFTP frames by the MCIF section of EOM 280. A header with the appropriate output SID value can be added to the encoded media payload to create an MCIFTP frame, which is delivered to the MCIF 292.

Other types of an EOM 280 can be used in order to adapt a media stream that was originated by an LEP 140 and needs to be delivered to an MRE 130. Such an EOM 280 can be referred as adaptor EOM 280. Two types of adaptor EOMs 280 can be used depending on the media type. In the input direction, the MCIF section of an allocated adaptor EOM 280 that is associated with the audio of a source LEP 140 may receive an input SID value that represents a stream of MCIFTP frames that carries decoded audio that originates from that source LEP 140. This stream can be decoded by a DM 260 that is related to that source LEP 140.

According to the currently allocated input SID value, the MCIF section may obtain, from the MCIF 292, MCIFTP frames of the selected decoded stream, organize the obtained frames, and deliver the decoded audio payload toward an audio encoder at the media section of the adaptor EOM 280. The audio encoder can comply with the audio compression standard used by one or more targeted MREs 130. Examples of audio compression standards include G.711, G.729, G.722.1C, G.719, etc. In some embodiments of a CUB 200, the audio DM 260 and EOM 280 can comprise a Scalable Audio Codec decoder/encoder respectively. A reader who wishes to learn more about an Scalable Audio Codec decoder/encoder is invited to read the U.S. Patent App. Publication No. 2012/0004918, which is incorporated by reference herein in its entirety.

In some embodiments, the MCIF section may receive indication of the audio energy of the audio stream. The indication can be received directly from the relevant DM 260 or from the CM 290. The MCIF section may also receive additional information that is needed in order to convert the encoded audio data chunks into a stream of relay RTP compressed audio data chunks. The additional information can comprise sequence number, source ID, time stamp, etc. In other embodiments, the EOM 280 can determine the audio energy of the stream.

The MCIF output section of the adaptor EOM 280 can be configured to operate in a similar way to an output audio RTP processor of an MRE 130 by adding and embedding additional parameters in the header of the RTP audio data chunks. The additional parameters can include a sequence number, source ID, time stamp, audio energy indication, etc. Then, relay RTP compressed audio data chunks can be organized as payload of MCIFTP frames by the MCIF section of adaptor EOM 280. A header with the appropriate output SID value can be added to the relay RTP compressed audio data chunks payload to create an MCIFTP frame, which is delivered to the MCIF 292. This stream of MCIFTP frames can be obtained from MCIF 292 by an audio MCM 270 that is associated with the target one or more MREs 130. A reader who wishes to learn more about an MRE 130 is invited to read U.S. Pat. No. 8,228,363, the entire content of which is incorporated herein by reference.

The second type of adaptor EOM 280 can be used in order to adapt video stream that was originated by an LEP 140 and needs to be delivered to an MRE 130. Such an adaptor EOM 280 can be allocated for each DM 260 that delivers a certain size of a decoded video image received from the source LEP 140. Thus, the MCIF section of an allocated adaptor EOM 280 may receive an input SID value that represents a stream of MCIFTP frames that carries scaled decoded video that originates from that source LEP 140 and is decoded and scaled by the DM 260. According to the currently allocated input SID value, the MCIF section may obtain, from the MCIF 292, MCIFTP frames of the selected scaled decoded video, organize the obtained frames, and deliver the decoded scaled video payload toward a video encoder at the media section of the adaptor EOM 280. The video encoder can comply with the video compression standard used by one or more target MREs 130. Examples of video compression standard include H.263, H.264, etc. In addition, the MCIF section may receive additional information that is needed in order to convert the encoded video data chunks into a stream of relay RTP compressed video data chunks. The additional information can comprise a sequence number, source ID, time stamp, segment number in the CP video image, etc.

The MCIF output section of the adaptor video EOM 280 can be configured to operate in a similar way to an output video RTP processor of an MRE 130 by adding and embedding additional parameters in the header of the RTP video data chunks. The additional parameters can include a sequence number, source ID, time stamp, segment number, etc. Then, relay RTP compressed video data chunks can be organized as payload of MCIFTP frames by the MCIF output section of adaptor EOM 280. A header with the appropriate output SID value can be added to the relay RTP compressed video data chunks payload to create an MCIFTP frame, which is delivered to the MCIF 292. This stream of MCIFTP frames can be obtained from MCIF 292 by a video MCM 270 that is associated with the target one or more MREs 130.

Other examples of a CUB 200 may add certain functionalities to modules of the CUB 200 other than as described above. For example, in some embodiments of a CUB 200, a video DM 260 may not include a scaler; instead, the video MCM 270 that is associated with an LEP 140 may include the scaler and the video EOM 280 that is associated with an MRE 130 may have a scaler, too.

In some embodiments of a CUB 200, the MCM 270 or EOM 280 associated with an MRE can be configured to convert the RTP header to a replayed RTP header. In other embodiments of a CUB 200, the MREONIP 240 can be adapted to implement the header conversion.

One embodiment of a CM 290 can manage the operation of the CUB 200. The CM 290 can receive from an MRE 130 or LEP 140 a request to establish a video conferencing session (dial-in conferee). The request can be received via one or more signaling and control modules 250. Alternatively, the CM 290 may obtain, from a management server (not shown in the drawings) a request to establish a conferencing session between a plurality of MREs 130 and/or LEPs 140 (dial out conferees). The request can be associated with a list of dial numbers (a dial number can represent an IP address) to be used by the CUB 200 in order to establish a connection with those endpoints via one or more signaling and control modules 250. Some conferencing sessions can comprise both dial in and dial out conferees. Establishing a connection with an endpoint can comply with well-known standards such as H.323 or SIP, for example.

For each endpoint, MRE 130 or LEP 140, that joins the session, the CM 290 may obtain from the endpoint information that is relevant to the session. Information such as but not limited to type of the endpoint, capabilities, bandwidth, compression standards, bit rate, etc. Negotiation with the endpoints can be done via an appropriate signaling and control module 250. Based on the obtained information, the CM 290 may allocate relevant internal modules to that endpoint. For an MRE 130, the CM 290 may allocate an MREINIP 220 for each video stream from the plurality of video streams (one for each size, quality level, etc.) that are obtained from that MRE 130; an MREINIP 220 for each audio stream from the plurality of audio streams (one for each quality level, for example) that are obtained from that MRE 130; one or more MREONIPs 240, each for a video stream that carries video images that are related to a CP video image to be presented on the MRE display unit; one or more MREONIPs 240, each for an audio stream that carries audio that is related to the mixed audio to be heard from the MRE 130 loudspeaker; one or more signaling and control modules 250, etc.

In addition, the CM 290 may allocate one or more media processor units for handling the media to/from that MRE 130. For example, one video DM 260 can be allocated for each video stream from the plurality of video streams (one for each size, quality level, etc.) that are obtained from that MRE 130; one audio DM 260 can be allocated for each audio stream from the plurality of audio streams (one for each quality level, for example) that are obtained from that MRE 130. The allocated video or audio DMs 260 are configured to comply with the compression standard, bit rate, etc. used for compressing the relevant stream.

One or more video EOMs 280 can be allocated, one for each video stream that carries scaled decoded video images that are obtained from a video DM 260 associated with an LEP 140 that participates in the session. One or more audio EOMs 280 can be allocated, one for each decoded audio stream that carries decoded audio in a certain quality that is obtained from an audio DM 260 associated with an LEP 140 that participates in the session. An audio and video MCM 270 may be allocated to that MRE 130 in order to obtain the relevant compressed audio and video streams from the MCIF 292 in order to compose the relayed RTP streams of audio and video to be transferred toward that MRE 130, etc.

In a similar way, a video DM 260 with one or more scalers can be allocated for decoding the video stream that is obtained from an LEP 140 and an audio DM 260 can be allocated for the audio stream that is obtained from that LEP 140. The allocated video and/or audio DM 260 are configured to comply with the compression standard, bit rate, etc. used for compressing the relevant stream. A video LEP MCM 270 can be allocated in order to build a CP video image from decoded video streams of selected endpoints to be presented on the LEP 140 display unit. A video EOM 280 can be allocated, to compress the decoded CP video image created by the allocated LEP video MCM 270 in order to be transferred toward that LEP 140 and presented on the display unit of that LEP 140. An audio LEP MCM 270 can be allocated in order to mix selected decoded audio streams to be heard on the LEP 140 loudspeaker. An audio EOM 280 can be allocated to compress the mixed decoded audio stream obtained from an audio MCM 270 that is associated with that LEP 140, etc.

In some embodiments, after allocating the internal resources for handling the media to/from an MRE 130 or LEP 140, an output SID value can be allocated to each stream that is delivered to the MCIF 292 by one of the allocated internal modules. Managing the allocation of the SID values and the MCIF 292 can be done by using a managing and control table (MCT). The type of the SID and the control of the MCIF 292 depend on the type of MCIF 292. For embodiments of a CUB 200 in which the MCIF 292 is a shared memory, an output SID value can represent an interval of addresses in the shared memory into which the relevant internal module may write (store) MCIFTP frames of its output stream. Writing and reading from the shared memory can be in a cyclic mode, for example. For obtaining a stream from the MCIF 292, each internal module that needs to obtain the stream may receive as an input SID the output SID value used by the module delivering the stream to MCIF 292. Based on the input SID value the relevant internal module may fetch MCIFTP frames one after the other in a cyclic mode from the same interval of addresses that is associated with that SID value.

In other embodiments of a CUB 200, an MCIF 292 can be a TDM bus. In such an embodiment, the output SID value may represent a time slot number into which each MCIFTP frame from that internal module will be transferred to the MCIF 292. For obtaining a stream from the MCIF 292, each internal module that needs to obtain the stream may receive as an input SID the output SID value used by the module delivering the stream to MCIF 292. Based on the input SID value, the relevant internal module may fetch MCIFTP frames that are associated with that time slot of the TDM bus.

In yet another embodiment of a CUB 200, the MCIF can be an Ethernet network controlled by an Ethernet switch having multicast routing capabilities. In such an embodiment of a CUB 200, the output SID can be a field in the Ethernet header of the MCIFTP frame. The output SID value can represent a multicast address for a stream. For obtaining the stream from the MCIF 292, each internal module that needs to obtain that stream from the MCIF 292 may use the same SID value as an input SID value. Based on the input SID value, the relevant internal module may obtain the relevant MCIFTP frames from the Ethernet switch. Other examples of a CUB 200 may use other types of MCIF and SID or any combination of the above examples. A skilled person in the art will appreciate that the scope of the invention is not limited to the type of the MCIF 292.

One embodiment of an MCT of a conference session can comprise a plurality of entries. Each entry can be associated with an MRE 130 or LEP 140 that participates in the session. Each entry can be associated with a plurality of fields. The fields can be divided into several sections. A first section can be referred as the endpoint section. Fields of the endpoint section can include information related to the endpoint, such as but not limited to the endpoint type (MRE or LEP), IP addresses for each stream, compression standards (audio and video) bit rates, the required layout of the CP video image, etc. In some conferences, the fields of the endpoint section remain without changes as long as the endpoint (MRE 130 or LEP 140) is connected to the session.

The second section of the MCT can be referred as the input section. The input section may include a plurality of fields for each entry, fields that are related to the input received from the endpoint (MRE 130 or LEP 140) associated with that entry. A field can be allocated for each resource that is assigned to handle a received compressed media stream from that endpoint, audio or video. Input section fields that belong to an entry of an LEP 140 can include information on the allocated LEPINIP 210, DM 260, EOM 280, for example. Input section fields that belong to an entry of an MRE 130 can include information on the allocated one or more MREINIPs 220, and one or more DMs 260, for example. Among other parameters that are related to an allocated resource, the information stored in some of the fields can include the output SID value of the stream of MCIFTP frames that is transferred by the resource to the MCIF 292. In some embodiments of a CUB 200 the fields of the input section can remain without changes as long as the associated endpoint (MRE 130 or LEP 140) is connected to the session. In other embodiments of a CUB 200, some of the fields of the input section can be changed during a conference session depending on the dynamics of the session. For example, a video DM 260 that is associated with a video input stream received from an LEP 140 or an MRE 130 can be allocated only when that endpoint (MRE 130 or LEP 140) is selected to be presented on a display unit of at least one other LEP 140 or MRE 130 as part of a CP video image of the conference.

The third section of the MCT can be referred as the output section. The output section may include a plurality of fields for each entry, fields that are related to the output streams to be transferred toward the endpoint (MRE 130 or LEP 140) associated with that entry. A field can be allocated for each resource that is assigned to handle an output media stream targeted toward that endpoint, audio or video. Output section fields that belong to an entry of an LEP 140 can include information on the allocated audio and video MCM 210, the audio and video EOM 280, and one or more LEPONIPs 230, for example. Output section fields that belong to an entry associated with an MRE 130 can include information on the allocated audio and video MRE MCM 270, one or more MREONIPs 240, for example. Among other parameters that are related to an allocated resource, the information stored in some of the fields can include the output SID value of the stream of MCIFTP frames that is transferred by the resource to the MCIF 292. In some embodiments of a CUB 200, the fields of the output section can remain without changes as long as the associated endpoint (MRE 130 or LEP 140) is connected to the session.

In other embodiments of a CUB 200, some of the fields of the output section can be changed during a conference session depending on the dynamics of the session. For example, a video MCM 270 that is associated with video output streams targeted toward an LEP 140 or MRE 130 may be reconfigured to combine a different number of streams when the CP layout to be presented on the endpoint changes. From time to time the MCT may change, for example each time an endpoint joins or leaves the conference session.

Based on the MCT, the CM 290 can create an MCIF routing table (MRT). The MRT can have a plurality of entries; each entry can be associated with an input of an allocated internal module of the CUB 200 and defines which one or more streams of MCIFTP frames will be obtained from the MCIF 292 for that internal module. An entry in the MRT can be allocated to an input of a DM 260 (audio or video); the fields associated with that entry can include the output SID value of an LEPINIP 210 or an MREINIP 220, for example. Another entry can be allocated to an audio MCM 270 associated with an LEP 140. This entry may have a plurality of fields, each field can include an output SID value that is related to an audio DM 270 that is associated with an MRE 130 or an LEP 140 that were selected to be mixed and heard via the loudspeaker of the associated LEP 140. Another entry can be allocated to the input of an audio EOM 280. The field associated with that entry can include the output SID value of the audio MCM 270 that mixes the audio stream targeted to an LEP 140 that is associated with the audio EOM 280. Another entry can be allocated to the input of an LEPONIP 230. The field associated with that entry can include the output SID value of the audio EOM 280 that encodes the mixed audio stream targeted to the LEP 140 related to that LEPONIP 230. In a similar way, additional entries with a plurality of fields can be allocated to handle the video streams toward an LEP 140 as well as the audio and video streams that are targeted toward an MRE 130.

The MRT can be updated and controlled by the CM 290. From time to time, each internal module of the CUB 200 can access the MRT in order to learn the appropriate one or more SIDs of streams of MCIFTP frames it needs to obtain from the MCIF 292. Alternatively, the internal modules can be updated with those SIDs by the CM 290. In embodiments of a CUB 200 in which input SID values are used in addition to the output SID values, the MRT can be used as the SID converting table of that session. In such an embodiment, each entry can be associated to a relevant input SID value. In embodiments where the internal modules are allocated dynamically when needed, the MRT may be updated accordingly.

During the conference session, a CM 290 can perform common activities of a control module of an MCU that controls a video conference between a plurality of LEPs 140 and common activities of a control mode of an MRM for controlling a conference session between a plurality of MREs 130. In addition, a CM 290 may provide additional functionality that is related to the novel architecture of the CUB 200. For example, every interval of a few tens of milliseconds (10 to 40 milliseconds, for example) based on the audio energy of the audio streams received from the plurality of MREs 130 and LEPs 140 that participate in the conference session, the CM 290 can select a group of a few endpoints (three to six, for example) with the highest audio energy. According to the selection, fields of entries in the MRT that are related to the input of an audio MCM 270 and an audio EOM 280 can be updated to include output SID values related to the new selected audio streams instead of previous ones.

In a similar way, every period of few seconds (three to five seconds, for example) the CM 290 can determine which endpoint can be selected as a speaker. A speaker can be the endpoint that during a certain percentage of the period of time (50-70% of intervals in that period of time, for example) has the highest audio energy. According to the selected speaker, the endpoints presented to the conference session participants can be selected. In order to adapt to the new selection, fields of entries in the MRT that are associated with a video MCM 270 and a video EOM 280 can be updated to include output SID values related to the new selected video streams instead of the previous ones.

In an embodiment of a CUB 200 in which video resources are allocated only when they are needed, each time an LEP 140 is selected to be presented in a CP video image, a video DM 260 can be allocated to decode the video stream received from that LEP 140. The decoding may include appropriate scaling. In such an embodiment, an Intra request can be send toward that LEP 140. In addition, one or more EOMs 280 can be allocated to compress a scaled decoded stream originated by that LEP 140 and is targeted toward an MRE 130 to be composed into a CP video image by the MRE 130. The relevant fields in the MRT can be updated accordingly. A similar process can be repeated when an MRE 130 is selected to be presented, etc.

Figure 3:
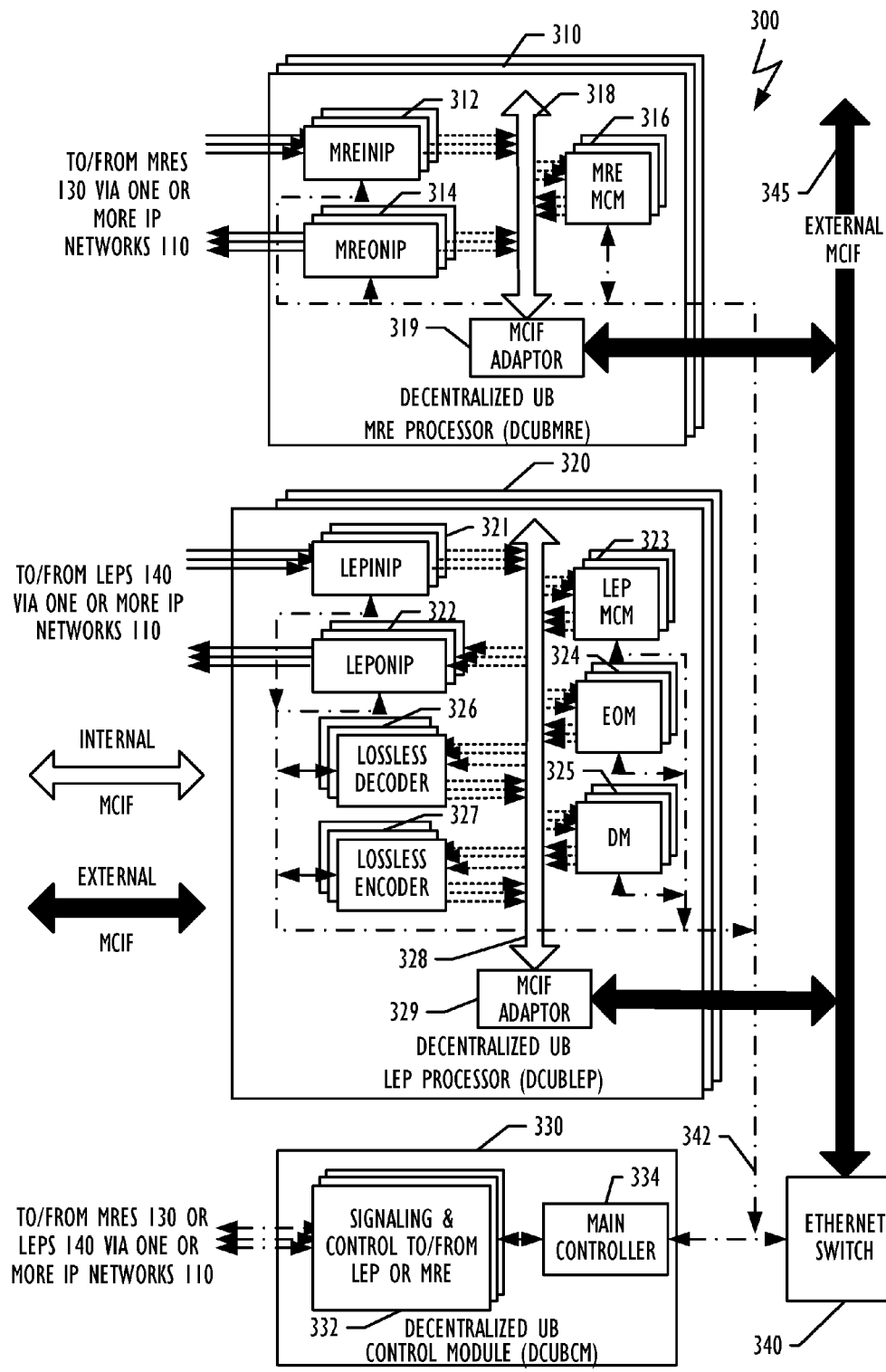
FIG. 3 depicts a simplified block diagram with relevant elements of one embodiment of a decentralized universal bridge (DCUB) system.

FIG. 3 depicts a simplified block diagram with relevant elements of one embodiment of a DCUB 300. A DCUB 300 can comprise three sections, an MRC section that includes one or more DCUB MRE processors (DCUBMREs) 310, a legacy section that includes one or more DCUB LEP processors (DCUBLEPs) 320 and a control section that include a DCUB control module (DCUBCM) 330. Each one of DCUBMRE 310 and DCUBLEP 320 can comprise an internal MCIF 318 or 328. Elements of the three sections can communicate with each other via an external MCIF 345. The plurality of internal MCIFs 318 and 328 with the external MCIF 345 can implement the task of the MCIF 292 which was described above in the discussion of FIG. 2.

The external MCIF 345 can carry MCIFTP frames over a high capacity local area network (LAN), such as but not limited to Ethernet. Other embodiments of an external MCIF 345 can comply with the IP protocol for example. In addition, an external MCIF 345 can be associated with a routing device. In an embodiment of a DCUB 300 in which the external MCIF 345 is an Ethernet network, the routing device can be an Ethernet switch 340 that has multicast capabilities, for example. An example of an Ethernet switch 340 can be a switch from Cisco® Catalyst® 3750-X and 3560-X Series, but other switches may be used. The Ethernet switch 340 can be controlled by the DCUBCM 330. Commands or status and reports from or to the DCUBCM 330 to or from each one of the processing units DCUBMRE 310 and DCUBLEP 320 can be carried over a control communication link 342. The control communication link 342 can be carried over the external MCIF 345.

One embodiment of a DCUBMRE 310 can comprise a plurality of MREINIPs 312, a plurality of MREONIPs 314, a plurality of MRE MCMs 316, an internal MCIF 318, and an MCIF adaptor 319. Each DCUBMRE 310 can communicate with one or more MREs 130 via an MREINIP 312 and an MREONIP 314. The internal MCIF 318 can connect the internal modules (MREINIPs 312, MREONIPs 314, and MRE MCMs 316) to each other and to the external MCIF 345 via the MCIF adaptor 319.

Each MREINIP 312 can be associated with an MRE 130 and can obtain a stream of IP packets that carry compressed media received from the associated MRE 130. The compressed media can be audio and/or video. Each obtained IP packet can be processed according to the Internet protocol. The RTP media payload, relay RTP compressed audio or compressed video data chunks, of each obtained packet, after being processed by the MREINIP 312 can be embedded in a MCIF frame according to the MCIFTP; and a stream of MCIFTP frames that carries relay RTP compressed media received from an MRE 130 is transferred toward the internal MCIF 318. The operation of an MREINIP 312 can be similar to the operation of MREINIP 220 which is described above and therefore it will not be further described.

Each MREONIP 314 can be associated with one or more MREs 130. One embodiment of an MREONIP 314 can obtain, from the DCUBCM 330, SID values of one or more compressed relayed streams to be collected from the internal MCIF 318. The number of streams depends on whether the relayed compressed media of a CP image or a mixed audio is sent over a single RTP connection or a plurality of RTP connections. The one or more streams of MCIFTP frames that carry compressed media are received from an MRE MCM 316 that is associated with the relevant one or more MREs 130. Obtaining the appropriate MCIFTP frames from the internal MCIF 318, based on the received SID values, depends on the type of the internal MCIF 318, shared memory, TDM bus, Ethernet, etc.

An embodiment of an MREONIP 314 can process each obtained MCIFTP frame and retrieve the compressed media embedded within the frame. Processing an MCIFTP frame can comprise removing the header of the MCIFTP frame, for example. The media payload of each processed MCIFTP frame can be adapted to comply with RTP to create an RTP compressed media data chunk. An RTP header with appropriate fields can be added. Fields of the RTP header can reflect the source of that stream (SSRC), the payload type (PT) which reflects the media as well as the encoder, sequence number, time stamp, etc. The RTP data chunks can be processed according to the Internet protocol in order to be embedded within an IP packet. An IP header can be added to the packet. The source IP address and port of the header can reflect the relevant MREONIP 314. The destination IP address can reflect the associated MRE 130 and the port number that is associated with that media type. The IP packet can be sent toward the associated MRE 130. In some embodiments or in some sessions, the IP packets can be sent toward a plurality of MREs 130 that share the same compression standard and the same audio mix or CP video image. The operation of an MREONIP 314 can be similar to the operation of an MREONIP 240, which is described above and therefore it will not be further described.

An MRE MCM 316 can be used in order to convert two or more selected relay RTP compressed video streams, from the internal MCIF 316, into one or more relayed RTP compressed video streams to be transmitted toward one or more MREs 130 via an associated MREONIP 314. Such an MRE MCM 316 can be referred to as a relayed video MRE MCM 316. Each MRE 130 can build and present a CP video image from received the transmitted one or more relayed RTP compressed video streams. The operation of a relayed video MRE MCM 316 is similar to the operation of a relayed video MCM 270, which is described above in the discussion of FIG. 2. Therefore the relayed video MRE MCM 316 will not be further described.

Another MRE MCM 316 can be referred to as a relayed audio MRE MCM 316. A relayed audio MCM 316 can be used in order to convert two or more selected relay RTP compressed audio streams, from the internal MCIF 316, into one or more relayed RTP compressed audio streams to be transmitted toward one or more MREs 130 via a relevant MREONIP 314. Each MRE 130 can decode, mix, and play the mixed audio by receiving the transmitted one or more relayed RTP compressed audio streams. The operation of a relayed audio MRE MCM 316 is similar to the operation of a relayed audio MCM 270, which is described above in the discussion of FIG. 2. Therefore the relayed audio MRE MCM 316 will not be further described.

An internal MCIF 318 can be similar to the MCIF 292. The operation of a MCIF 292, MCIFTP frames, and handling of SID values were described above in the discussion of with FIG. 2, and will not be further described. An MCIF adaptor 319 can be used in order to interface between the internal MCIF 318 and the external MCIF 345. The MCIF adaptor 319 associates the external MCIF 345 with the internal MCIF 318 to act as one MCIF of the DCUB 300.

The operation of an MCIF adaptor 319 depends on the type of the internal MCIF 318 and the type of the external MCIF 345.

In an embodiment of a DCUB 300, the internal MCIF 318 can be a shared memory while the external MCIF 345 can be an Ethernet network, for example. In such an embodiment, the MCIF adaptor 319 can obtain a SID value, a source Ethernet address, and a destination Ethernet address, for each stream of MCIFTP frames. For a stream of MCIFTP frames that is transferred from the internal MCIF 318 to the external MCIF 345 the SID value can represent an interval of addresses in the shared memory (the internal MCIF 318) from which the MCIF adaptor 319 may fetch MCIFTP frames, in a cyclic mode, to be transferred toward the external MCIF 345. The relevant source Ethernet addresses can represent the correspondence between the DCUBMRE 310 and the relevant internal module MREINIP 312 or MRE MCM 316 that generates that stream of MCIFTP frames. The associated destination Ethernet address can represent another DCUBMRE 310 or DCUBLEP 320 and the relevant internal module in that unit to which the frame is transferred. After adding the Ethernet header, with the appropriate SID value and the Ethernet addresses, the Ethernet MCIFTP frame can be transferred over the external MCIF 345 toward its destination.

For a stream of MCIFTP frames that is transferred from the external MCIF 345 to the internal MCIF 318, the SID value can represent an interval of addresses in the shared memory (the internal MCIF 318) into which the MCIF adaptor 319 may store MCIFTP frames, in a cyclic mode, which are received from the external MCIF 345. The relevant destination Ethernet addresses can be associated with that SID value and represents the correspondence between the DCUBMRE 310 and the relevant internal module MREINIP 312 or MRE MCM 316 that are the target of that stream of MCIFTP frames. After processing the Ethernet header based on the appropriate SID value, the stream of MCIFTP frames can be stored in a cyclic mode in the interval of addresses in the shared memory (Internal MCIF 318) that is associated with that SID value.

A DCUBLEP 320 can comprise a plurality of LEPINIPs 321, a plurality of LEPONIPs 322, a plurality of LEP MCMs 323, a plurality of EOMs 324, a plurality of DMs 325, an internal MCIF 328, and an MCIF adaptor 329. Each DCUBLEP 320 can communicate with one or more LEPs 140 via the LEPINIP 321 and the LEPONIP 322. The internal MCIF 328 can connect the internal modules of the DCUBLEP 320 to each other and to the external MCIF 345 via the MCIF adaptor 329. The internal MCIF 328 and the MCIF adaptor 329 operate in a similar way to the operation of the internal MCIF 318 and the MCIF adaptor 319 (respectively) of a DCUBMRE 310, as described above and therefore, will not be further described.

The LEPINIP 321, LEPONIP 322, EOM 324, and DM 325 operate in a similar way to the LEPINIP 210, LEPONIP 230, EOM 280, and DM 260 (respectively) that were described above in the discussion of FIG. 2 and therefore will not be further described.

A DCUBLEP 320 may further comprise a plurality of lossless decoders (LLDs) 326, a plurality of lossless encoders (LLEs) 327. The LLD 326 and the LLE 327 can be used for compressing, using a lossless algorithm, decoded media that is uncompressed (audio or video) that needs to be transferred over the external MCIF 345 toward another DCUBLEP 320 or DCUBMRE 310. A pair of an LLE 327 and an LLD 326 can execute a lossless compression algorithm such as but not limited to GZIP, Lempel-Ziv-Welch (LZW), lossless JPEG 2000, etc. In another embodiment, the lossless compression can be implemented by a partial H.264 encoding, without executing the lossless section, for example. As used herein, the terms semi-compression and lossless compression should be understood as interchangeable.

In an alternate embodiment of DCUBLEP 320, an LLE 327 and an LLD 326 can be included in an embodiment of a MCIF adaptor 329. In such an embodiment, the payload of MCIFTP frames that are transferred from the internal MCIF 328 to the external MCIF 345 via the MCIF adaptor 329 can be losslessly compressed by the internal LLE 327 of the MCIF adaptor 329 before being adapted to be carried over the external MCIF 345. In the other direction, a payload of MCIFTP frames that are transferred from the external MCIF 345 to the internal MCIF 328 can be losslessly decompressed by the internal LLD 326 of the MCIF adaptor 329 before being adapted to be carried over the internal MCIF 328.

A DCUBCM 330 can comprise a plurality of signaling and control modules 332 to/from an LEP or MRE and a main controller 334. A signaling and control module 332 can operate in a similar way to the signaling and control module 250 that is described above in the discussion of FIG. 2. The signaling and control module 332 can be used for establishing the communication session and connecting the relevant endpoint to the conference. The main controller 334, via the relevant signaling and control module 332, can authenticate the endpoint and the relevant conference session. After authentication, a negotiation stage can be initiated in order to define the type of the endpoint, the capabilities of the endpoint, defining the compression standards, bit rate, etc. In addition, a layout that describes the CP video image, a forced speaker, etc., for that endpoint, can be defined. The negotiation can be based on H.323 or SIP, for example, which are well known in the art and will not be further discussed.

The main controller 334 can manage the operation of the DCUB 300. The main controller 334 can receive from an MRE 130 or LEP 140 a request to establish a video conferencing session (dial-in conferee). The request can be received via one or more signaling and control modules 332. Alternatively, the main controller 334 may obtain, from a management server (not shown in the drawings) a request to establish a conferencing session between a plurality of MREs 130 and/or LEPs 140 (dial out conferees). The request can be associated with a list of dial out numbers (a dial number can represent an IP address) to be used by the main controller 334 in order to establish a connection with those endpoints via one or more signaling and control modules 332. Some conferencing sessions can comprise both dial in and dial out conferees. Establishing a connection with an endpoint can comply with well know standards such as H.323 or SIP, for example.

For each endpoint, MRE 130 or LEP 140, that joins the session, main controller 334 may allocate relevant internal modules to that endpoint. For an MRE 130, main controller 334 may associate an DCUBMRE 310 to that session and allocate an MREINIP 312 for each video stream from the plurality of video streams (one for each size, quality level, etc.) that are obtained from that MRE; an MREINIP 312 for each audio stream from the plurality of audio streams (one for each quality level, for example) that are obtained from that MRE 130; one or more MREONIPs 314, each for a video stream that carries video image that is related to a CP video image to be presented on the MRE 130's display unit; one or more MREONIPs 314, each for an audio stream that carries audio that is related to the mixed audio to be heard from the MRE loudspeaker; one or more signaling and control modules 332, etc.

In addition, the main controller 334 may allocate one or more media processor units for handling the media to/from that MRE 130. For example, one video DM 325 can be allocated for each video stream from the plurality of video streams (one for each size, quality level, etc.) that are obtained from that MRE 130. Similarly, one audio DM 325 can be allocated for each audio stream from the plurality of audio streams (one for each quality level, for example) that are obtained from that MRE 130. The allocated video or audio DMs 325 can be configured to comply with the compression standard, bit rate, etc. used for compressing the relevant stream. Further, those DMs 325 can reside in a DCUBLEP 320 that is associated to that conference session. In order to reach the associated DM 325, each stream of MCIFTP frames from the relevant MREINIP 312 can be transferred via the internal MCIF 318, MCIF adaptor 319, the external MCIF 345, the MCIF adaptor 329 and the internal MCIF 328. The main controller 334 can be configured to allocate SID values and Ethernet addresses to those streams, and to set the Ethernet switch 340 and the two MCIF adaptors 319 and 329 accordingly.

One or more video EOMs 324 can be allocated by main controller 334, one for each video stream that carries scaled decoded video images that are obtained from a video DM 325 associated with an LEP 140 that participates in the session; One or more audio EOMs 324 can be allocated, one for each decoded audio stream that carries decoded audio in a certain quality that is obtained from an audio DM 325 associated with an LEP 140 that participates in the session. A compressed stream of MCIFTP frames at the output of those EOMs 324 can be transferred via the internal and the external MCIFs 318, 328, and 345, as well as MCIF adaptors 319 and 329 and the Ethernet switch 340 to an appropriate MRE MCM 316. The main controller 334 can continue allocating and controlling the required resources, the required SID values and the required Ethernet source and destination addresses. The rest of the operation of main controller 334 is similar to the operation of CM 290, which is described above in the discussion of FIG. 2 and will not be further described.

Figure 4:
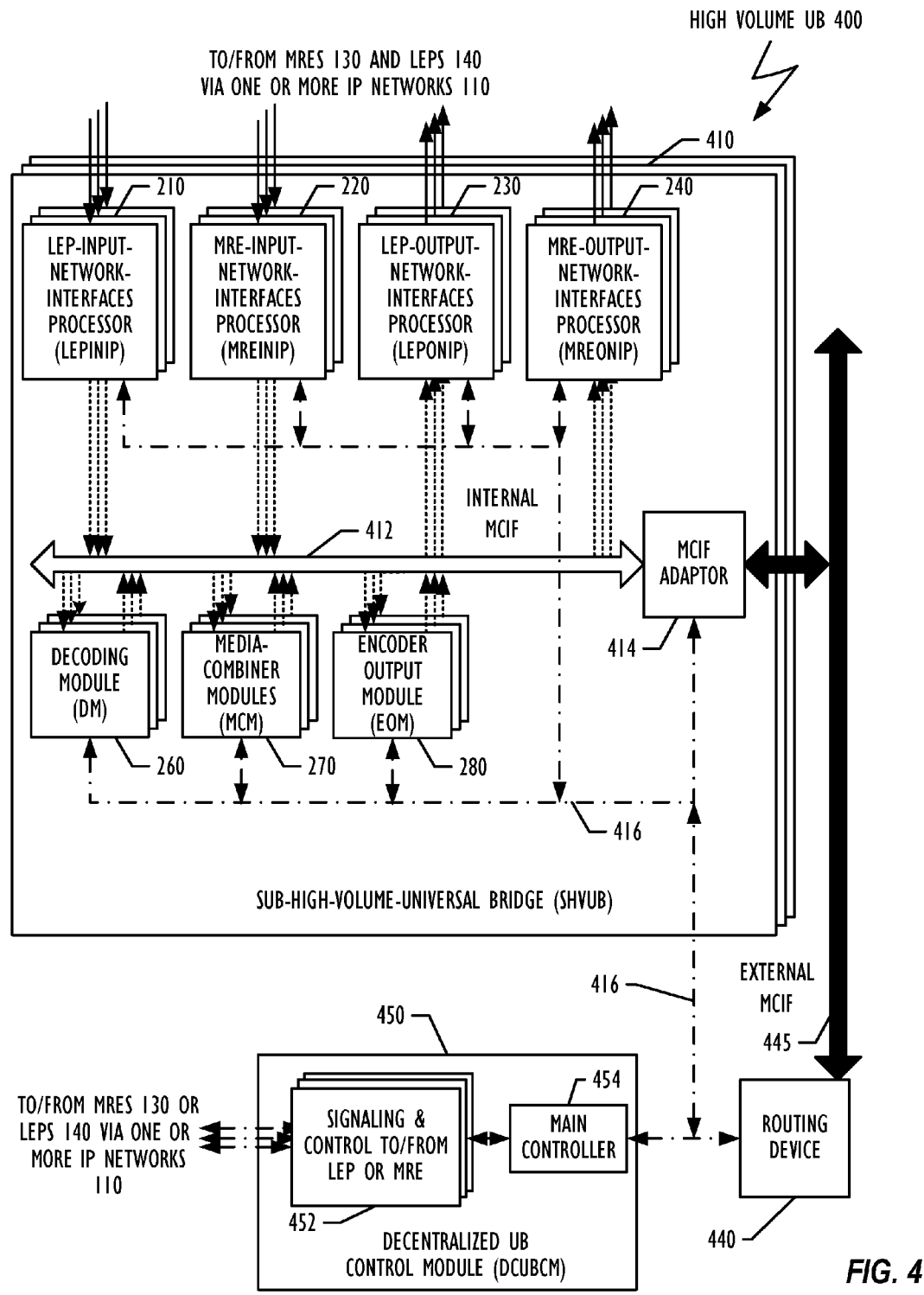
FIG. 4 depicts a simplified block diagram with relevant elements of one embodiment of a high volume universal bridge (HVUB).

FIG. 4 depicts a simplified block diagram with relevant elements of an embodiment of a high volume universal bridge (HVUB) 400. The HVUB 400 can be used in sites that have a high volume of multimedia conferences. The HVUB 400 can comprise a plurality of sub-high volume universal bridge (SHVUB) modules 410, a DCUB control module (DCUBCM) 450 and an external MCIF 445 having a routing device 440. Each SHVUB 400 and the DCUBCM 450 can communicate with each other via the external MCIF 445. In some embodiments of an HVUB 400, each of the SHVUBs 410 as well as the DCUBCM 450 can be embedded in a blade computer. In such an embodiment, the HVUB 400 can be extended, from time to time, by adding one or more SHVUBs 410.

An SHVUB 410 can include internal modules that are similar to the internal modules of the CUB 200 which are described above in the discussion of FIG. 2, such as LEPINIPs 210, MREINIPs 220, LEPONIPs 230, MREONIPs 240, DMs 260, MCMs 270, and EOMs 280. Those modules will not be further described. In addition a SHVUB 410 can include an internal MCIF 412 and an MCIF adaptor 414. The internal MCIF 412 and the MCIF adaptor 414 together with the external MCIF 445 can implement the task of the MCIF 292 which was described above in the discussion of FIG. 2.

Further, the operation of the internal MCIF 412, the MCIF adaptor 414, the external MCIF 445, and the routing device 440 are similar to the operation of the internal MCIFs 318 and 328, the MCIF adaptor 319 and 329, the external MCIFs 345, and the routing device 340, which are described above in the discussion of FIG. 3, and therefore will not be further described. In embodiments where the external MCIF complies with Ethernet protocol, the routing device 340 and 440 can be an Ethernet switch. In other embodiments in which the external MCIFs 345 or 445 comply with IP, the routing devices 340 and 440 can be Internet routers.

The routing device 440, the external MCIF 445, and each one of the SHVUBs 410 can be controlled by the DCUBCM 450. Commands or status and reports from or to DCUBCM 450 to or from each one of the SHVUBs 410 can be carried over a control communication link 416. The control communication link 416 can be carried over the external MCIF 445.

A DCUBCM 450 can comprise a plurality of signaling and control modules 452 to/from an LEP or MRE and a main controller 454. The operation of the DCUBCM 450 is similar to the operation of DCUBCM 350 that is described above in the discussion of FIG. 3 and therefore will not be further described.

Figure 5A:
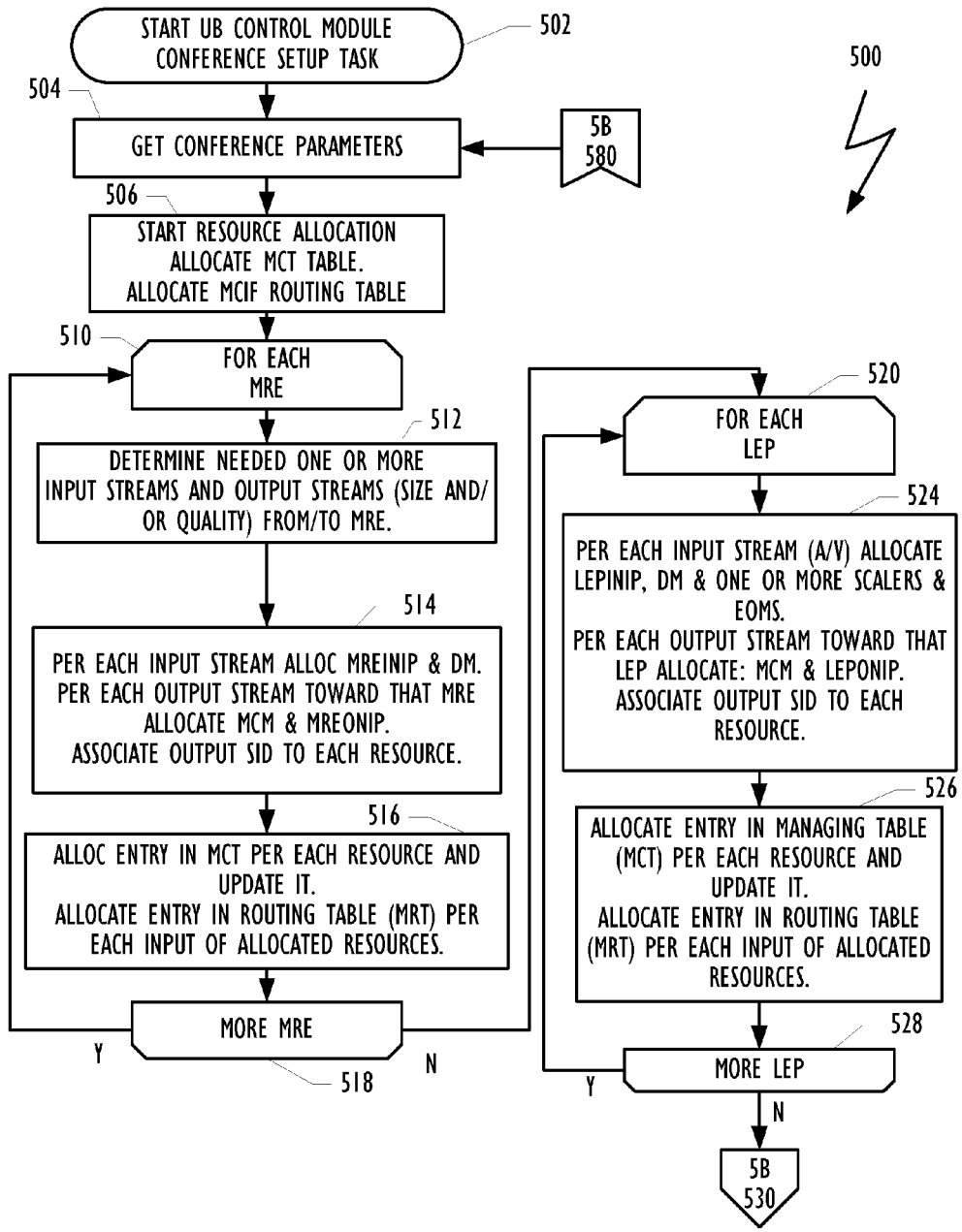
FIGS. 5A and 5B depict a flowchart illustrating relevant actions of a conference setup method 500 implemented by an embodiment of a CUB.
Figure 5B:
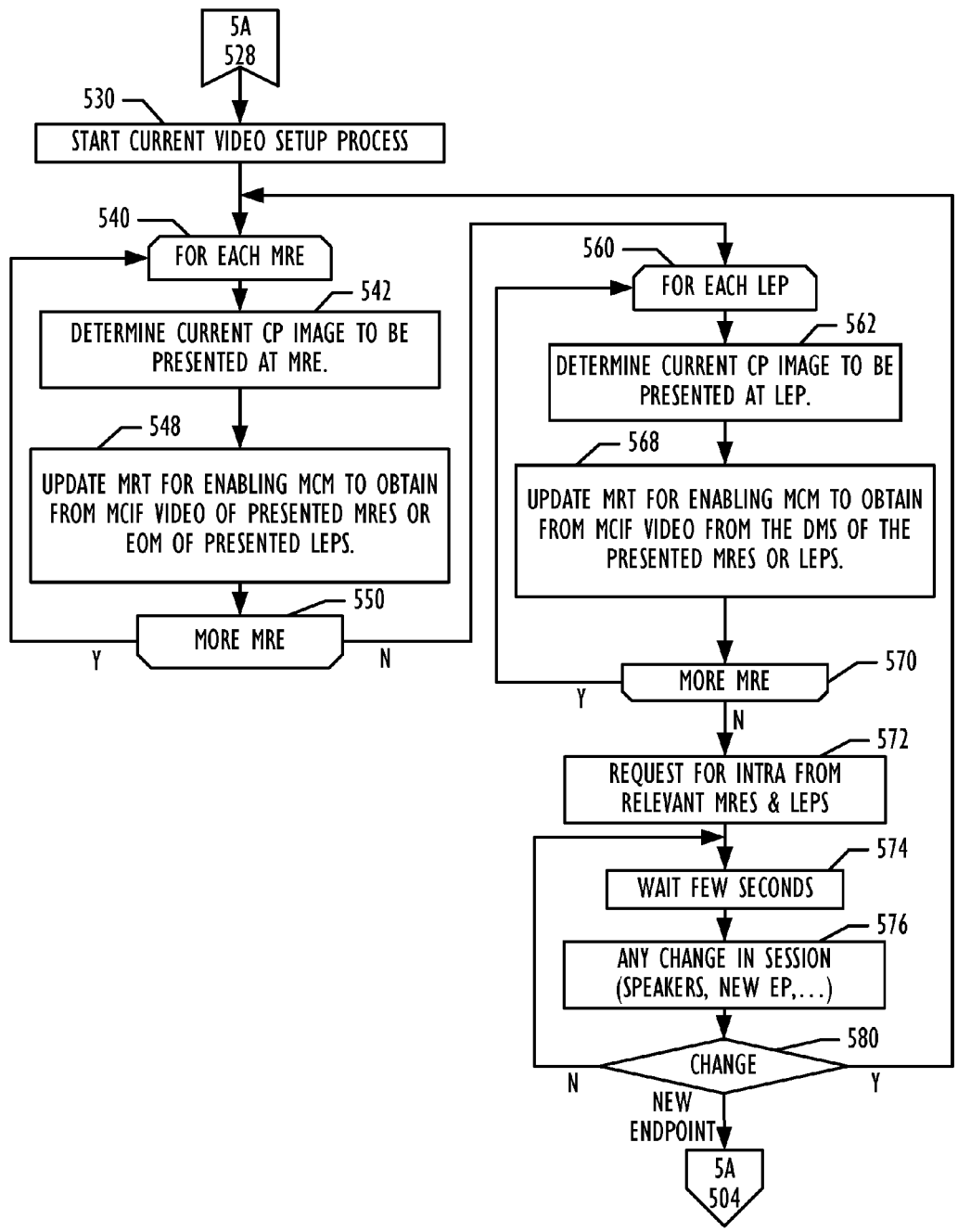

Referring now to FIGS. 5A and 5B that illustrate a process 500 that can be implemented by a CM 290 of a CUB 200 according to one embodiment. A similar method, with minor adaptation, can be used by main controller 334 or 454 of the DCUBCM 330 or the DCUBCM 450, respectively. Method 500 can be initiated in block 502 at the beginning of a multimedia conference session or each time a new conferee joins an existing multimedia conference. FIG. 5A illustrates a setup task, while FIG. 5B illustrates relevant actions of CM 290 while the conference is running.

Task 500 can be initiated by CM 290 upon obtaining an indication to start a reserved session. The indication can include a session profile. The session profile can include information on the session, information such as but not limited to the session duration, dial-in or dial-out numbers, compression parameters, CP layout, type of endpoints, etc. The indication can be obtained from a management server, not shown in the drawings. Alternatively an impromptu conference can be initiated in block 502 upon receiving a dial in call to a virtual meeting room. A conference profile and virtual meeting rooms are well known in the art and will not be further described. A reader who wishes to learn more about those functionalities is invited to read U.S. Pat. Nos. 7,085,243, 7,310,320, and 7,830,824, the content of which are incorporated herein by reference.

Upon initiation, conference parameters can be obtained in block 504. The conference parameters can be obtained from the conference profile, the meeting room profile or by negotiating with a calling endpoint. Based on the obtained conference parameters, resources can be allocated in block 506, such as but not limited to managing and control tables (MCTs), MCIF routing tables (MRTs), etc., that can be used while the session is active. Further resources and filling the MCT and MRT can be done, for each MRE 130, in a loop between blocks 510 and 518 and for each LEP 140 in a following loop between blocks 520 and 528. If a new conferee joins the session, an appropriate cycle of the relevant loop can be performed, based on the type of the endpoint, MRE 130 or LEP 140.

For each MRE 130, a cycle of the first loop can be initiated in block 510. At block 512, based on the collected information, the number of input streams (received from the MRE). Based on the CP layout presented by that MRE 130, and the number of audio streams to be mixed by that MRE 130, the number of output streams (be sent toward that MRE 130) for each type of media (audio/video) is determined. The number of streams can depend on the number of different sizes (resolution), different frame rates, different quality, different bit-rate, etc. of the streams that were obtained/transmitted from/to that MRE 130.

For each input stream (audio or video) an appropriate MREINIP 220 and DM 260 (audio or video) can be allocated in block 514. An output SID value can be allocated for each MREINIP 220. In addition an input SID value and an output SID value can be allocated for each DM 260 (audio or video). The DM 260 can be used for decoding compressed video needed for composing a CP video image to be presented by an LEP 140; alternatively, the DM 260 can be used for decoding audio needed for mixing audio to be used in an LEP 140. Further, for each output stream (audio or video), an appropriate MREONIP 240 and MRE MCM 270 (audio or video) can be allocated in block 514. An input SID value can be allocated for each MREONIP 240. In addition an input SID value and an output SID value can be allocated for each MRE MCM 270 (audio or video).

At block 516 an entry is allocated in the MCT for each allocated resource. Each entry can include a plurality of fields that are used for managing the resource during that session. An entry that is associated with an MREINIP 220 or an MREONIP 240 may include information that is related to the IP connection between the MREINIP 220 or the MREONIP 240 and the relevant MRE that carries the relevant stream, the output/input SID values, etc. An entry that is associated with a DM 260 (audio or video) may include information that is related to the compression that was used by the relevant MRE, the input and output SID values related to that DM, etc. for each resource. In addition an entry can be allocated in block 516 in the MRT (SID converting table) for each input stream of the allocated DM 260, MRE MCM 270, and MREONIP 240. Each entry can have at least two fields. In the first field the input SID value of that stream can be written. In the second field the output SID value of the stream to be obtained by this resource can be written. This field can be changed according to the dynamic of the session. In an embodiment of CUB 200 in which a single SID value is used, only one field can be used for each entry of an input stream. From time to time the value of this field can be updated according to the dynamic of the session.

Next at block 518 a decision is made whether one or more additional MREs 130 participate in the session. If yes, method 500 returns to block 510 and starts a new cycle of the loop for the next MRE 130. If not, process 500 proceeds to block 520 for handling one or more LEPs 140 that participate in the session.

For each participating LEP 140, a cycle of the second loop can be initiated in block 520. For each input stream (audio or video) an appropriate LEPINIP 210, a DM 260 (audio or video), and one or more scalers (for video DM) can be allocated in block 524. In addition an EOM 280 can be allocated for each scaled decoded video. The EOM 280 can be used when the relevant LEP 140 is included in a CP image that is presented by an MRE 130. An output SID value can be allocated for each LEPINIP 210. In addition an input SID value and an output SID value can be allocated for each DM 260 (audio or scaled video) and EOM 280. Further, for each output stream (audio or video) toward that LEP 140, an appropriate LEPONIP 230 and a legacy MCM 270 (audio or video) can be allocated in block 524. The legacy MCM 270 can be adapted to compose the relevant CP video image. A frame memory in the appropriate size can be allocated for the CP video image. The frame memory can be divided into segments according to the defined layout, etc. An input SID value can be allocated for each LEPONIP 230. In addition an input SID value and an output SID value can be allocated for each legacy MCM 270 (audio or video).

At block 526 an entry is allocated in the MCT for each allocated resource for that LEP 140. Each entry can include a plurality of fields that are needed for managing the resource during that session. An entry that is associated with an LEPINIP 210 or an MREONIP 230 may include information that is related to the IP connection between the LEPINIP 210 and the MREONIP 230 and the relevant LEP 140 that carries the relevant stream, the output/input SID values, etc. An entry that is associated with a DM 260 (audio or video) may include information that is related to the compression that was used by the relevant LEP 140, the input and output SID values related to that DM 260, etc. for each resource. In addition an entry can be allocated in block 526 in the MRT (SID converting table) for each input stream of the allocated DM 260, legacy MCM 270, and LEPONIP 230. In some embodiments, each entry can have at least two fields. In the first field the input SID value of that stream can be written. In the second field the output SID value of the stream to be obtained by this resource can be written. This field can be changed during the session according to the dynamic of the session. In an embodiment of a CUB 200 in which a single SID value is used, a single field may be used for each entry of an input stream. From time to time the value of this field can be updated according to the dynamic of the session.

Next at block 528 a decision is made whether an additional LEP 140 participates in the session. If yes, method 500 returns to block 520 and starts a new cycle of the loop for the next LEP. If not, process 500 proceeds to block 530 in FIG. 5B for handling the ongoing session.

At block 530 a current video setup process can be initiated. The current video setup process can be handled in two internal loops. In the first loop, from block 540 to block 550, the setup of one or more MREs 130 that participate in the session can be handled. The second loop, from block 560 to block 572, deals with the current video setup of one or more LEPs 140 that participate in the session. The current video setup process can be repeated every few seconds, 1 to 10 seconds for example, in order to respond to changes in the conference session, such as but not limited to: a new speaker, a new participant, etc. A similar current audio setup process for handling the audio (not shown in the drawing) can be executed by a CM 290. The current audio setup process can be used for adapting the mixed audio to changes in the conference session. In contrast to the video process, the current audio setup process can be repeated in higher frequency, every few tens of milliseconds to few hundreds of milliseconds for example. In the audio process an audio MCM 270 handles audio streams for mixing them.

A cycle of the loop, for each MRE 130, may start by determining in block 542 which endpoints (MRE 130 or LEP 140) will be presented in the current CP video image that will be presented on that MRE 130's display. Selecting the presented endpoints and the segment in which video images from each endpoint will be presented can be based on different criteria. The criteria to be used can be defined at block 504. In one conference session the criteria can be the energy of the audio obtained from each endpoint. For example, a speaker can be defined as the endpoint that during a certain percentage (60-80%, for example) of a certain period (1-10 seconds for example) has the highest audio energy. In other conference sessions, a certain endpoint can be forced to be the speaker, In yet other conference sessions, the MRE 130 can define the selected endpoints that will presented by it, etc.

At block 548 the entry in the MRT that is associated with the MCM 270 that is associated with that MRE 130, can be updated. The update can be based on the selection of the current presented endpoints, the selection of the current speaker, the layout parameters (size and location of each segment), etc. Accordingly, the output SID values of MREINIP 240 that are associated with the currently presented one or more MREs 130, as well as the output SID values of the EOMs 280 that are associated with the currently presented one or more LEPs 140, can be written in the relevant entry of the MRT. Based on the updated MRT, the MCM 270 can obtain the appropriate streams of MCIFTP frames that carry relay RTP compressed video data chunks received from the presented MREs 130. In addition, the MCM 270 can obtain the appropriate streams of MCIFTP frames that carry relay RTP compressed video data chunks that originated from the selected LEPs 140 after being decoded and scaled to the appropriate size by an appropriate DM 260, and compressed by the EOM 280 into relay RTP compressed video data chunks. Next, a decision is made in block 550 whether additional MREs 130 participate in the session. If yes, method 500 returns to block 540. If not, then the second loop is initiated in block 560 for handling the current video setup process for each LEP 140 that participate in the session.

A cycle of the loop, for each LEP 140, may start by determining in block 562 which endpoints (MRE 130 or LEP 140) will be presented in the current CP video image that will be presented on that LEP 140's display. Selecting the presented endpoints and the segment in which video images from each endpoint will be presented is performed similar to the selection described above in block 542.

At block 568 the entry in the MRT that is associated with the MCM 270 that is associated with that LEP 140 can be updated. The update can be based on the selection of the currently presented endpoints, the selection of the current speaker, the layout parameters (size and location of each segment), etc. Accordingly, the output SID values of the DM 260 that are associated with the currently presented one or more LEPs 140 and MREs 130 can be written in the relevant entry of the MRT. Based on the updated MRT the LEP MCM 270 can obtain the appropriate streams of MCIFTP frames that carry DMDUs that originated from the presented LEPs 140 and MREs 130 after being decoded and scaled. Next, a decision is made in block 570 whether any additional LEP 140 participates in the session. If yes, method 500 returns to block 560. If not, an Intra frame can be requested in block 572 from the presented LEPs and MREs.

Then process 500 can wait in block 574 few seconds, for example 1 to 10 seconds. After the waiting period the current status of the session can be checked in block 576 looking for changes. A change can be: a new conferee that joins the session, a conferee left the session causing layout to be changed, a new speaker, etc. If in block 580, there is no change, process 500 returns to block 574 and waits for another period of a few seconds. If in block 580 a new speaker is selected, then process 500 returns to block 540 and repeats the current video setup process. If in block 580 a new endpoint joins the session, method 500 can start from the beginning and return to block 504, getting the current conference parameters in view of the new endpoint. The new endpoint can affect the current layout, the compression parameters, etc. This process can continue until the end of the conference session.

In the description and claims of the present disclosure, "comprise," "include," "have," and conjugates thereof are used to indicate that the object or objects of the verb are not necessarily a complete listing of members, components, elements, or parts of the subject or subjects of the verb.

It is to be understood that the above description is intended to be illustrative, and not restrictive. The above-described apparatus, systems, and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association with different embodiments of the disclosure. The scope of the invention is limited only by the following claims and equivalents thereof.

What is claimed is:

1. A universal bridge system for a multimedia conferencing system, comprising:
   a first interface, configured to carry streams of transport frames according to a transport protocol, wherein the first interface is a network switch configured for multicast routing of transport frames;
   a control module connected to the first interface, adapted to
      allocate stream identifiers for each stream of transport frames;
      dynamically allocate resources of the universal bridge system to multimedia sessions; and
      maintain a routing table associating input stream identifiers with output stream identifiers, wherein multicast routing is performed using the stream identifiers as multicast addresses;
   a media relay processor, connected to the first interface and configured to receive compressed media received from a first media relay endpoint, to deliver one or more streams of packets toward a second media relay endpoint, to deliver streams of transport frames to the first interface, and to receive streams of transport frames from the first interface; and
   a legacy processor, connected to the first interface, configured to receive compressed media received from a first legacy endpoint, to deliver one or more streams of packets toward second legacy endpoint, to deliver streams of transport frames to the first interface, and to receive streams of transport frames from the first interface.

2. The universal bridge of claim 1, wherein the media relay processor comprises:
   a second interface, configured to carry streams of transport frames according to the transport protocol;
   a media relay input processor, coupled to the second interface and configured to deliver to the second interface transport frames carrying compressed media received from the first media relay endpoint;
   a first type media combiner module, coupled to the second interface and configured to combine a plurality of streams of transport frames carrying compressed media in a stream of transport frames carrying combined media targeted toward a media relay endpoint;
   a media relay endpoint output processor, coupled to the second interface and configured to obtain one or more streams of transport frames carrying combined media created by the first type media combiner module from compressed media originated by the first media relay endpoint and the first legacy endpoint and deliver one or more streams of packets toward the second media relay endpoint; and
   a first interface adaptor module, coupled to the first and second interfaces, that is configured to deliver transport frames between the first interface and the second interface.

3. The universal bridge of claim 1, wherein the legacy processor comprises:
   a third interface, configured to carry streams of transport frames according to the transport protocol; and
   a legacy endpoint output processor, coupled to the third interface and configured to obtain a stream of transport frames carrying compressed media originated by the first media relay endpoint and the first legacy endpoint and deliver one or more streams of packets toward the second legacy endpoint; and
   a second interface adaptor module, coupled to the first and third interfaces, configured to deliver transport frames between the first interface and the third interface.

4. The universal bridge of claim 3, wherein the legacy processor further comprises:
   a legacy input processor, coupled to the third interface, configured to deliver to the third interface transport frames carrying compressed media received from the first legacy endpoint.

5. The universal bridge of claim 4, wherein the legacy processor further comprises:
   a decoder module, coupled to the third interface and configured to obtain a stream of transport frames carrying compressed media and generate a stream of transport frames carrying decoder module data units.

6. The universal bridge of claim 3, wherein the legacy processor further comprises:
   a legacy input processor, coupled to the third interface, configured to receive compressed media from the first legacy endpoint, and further comprises:
   a decoder module, configured to process chunks of compressed media into a stream of transport frames carrying decoder module data units to be transferred to the third interface; and
   wherein the legacy input processor is further configured to deliver data chunks of compressed media to the decoder module.

7. The universal bridge of claim 3, wherein the legacy processor further comprises:
   a lossless decoder, coupled to the third interface, configured to decode, using a lossless technique, lossless compressed media carried in transport frames received from the first interface.

8. The universal bridge of claim 3, wherein the legacy processor further comprises:
   a lossless encoder, coupled to the third interface, configured to compress, using a lossless technique, uncompressed media for delivering lossless compressed media in transport frames to the first interface.

9. The universal bridge of claim 3, wherein the legacy processor second interface adaptor module comprises:

a lossless decoder, configured to decode, using a lossless technique, compressed media carried in transport frames received from the first interface; and a lossless encoder, configured to compress, using a lossless technique, uncompressed media for delivering lossless compressed media in transport frames to the first interface.

10. The universal bridge system of claim 3, wherein the legacy processor further comprises:

a second type media combiner module, coupled to the third interface, configured to combine a plurality of streams of transport frames carrying decoder module data units into a stream of transport frames carrying combined media targeted toward the second legacy endpoint.

11. The universal bridge system of claim 10, wherein at least one of the plurality of streams of transport frames carrying decoder module data units originated from a media relay endpoint.

12. The universal bridge of claim 3, wherein the legacy processor further comprises:

an encoder module, coupled to the third interface and configured to obtain a stream of transport protocol frames carrying decoder module data units and generate a stream of transport frames carrying compressed media.

13. The universal bridge of claim 1, comprising a plurality of media relay processors and a plurality of legacy processors.

* * * * *